(12) United States Patent
Shand

(10) Patent No.: US 12,352,891 B2
(45) Date of Patent: *Jul. 8, 2025

(54) SELECTIVE DEACTIVATION OF LIGHT EMITTERS FOR INTERFERENCE MITIGATION IN LIGHT DETECTION AND RANGING (LIDAR) DEVICES

(71) Applicant: Waymo LLC, Mountain View, CA (US)

(72) Inventor: Mark Alexander Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,209

(22) Filed: Feb. 20, 2024

(65) Prior Publication Data

US 2024/0192321 A1   Jun. 13, 2024

Related U.S. Application Data

(63) Continuation of application No. 18/068,665, filed on Dec. 20, 2022, now Pat. No. 11,960,029, which is a
(Continued)

(51) Int. Cl.
*G01S 7/48* (2006.01)
*G01S 7/481* (2006.01)
(Continued)

(52) U.S. Cl.
CPC .......... *G01S 7/4804* (2013.01); *G01S 7/4814* (2013.01); *G01S 7/4815* (2013.01); *G01S 7/4816* (2013.01);
(Continued)

(58) Field of Classification Search
CPC .... G01S 7/4804; G01S 7/4814; G01S 7/4815; G01S 7/4816; G01S 7/499; G01S 17/10; G01S 17/42; G01S 17/931
See application file for complete search history.

(56) References Cited

U.S. PATENT DOCUMENTS 5,504,570 A   4/1996 Akasu
5,699,151 A   12/1997 Akasu
(Continued)

FOREIGN PATENT DOCUMENTS

CN   110927734 A   3/2020
EP   1726129 B1   3/2005
(Continued)

OTHER PUBLICATIONS

"Here's how Uber's self-driving cars are supposed to detect pedestrians"; Devin Coldeway (Mar. 20, 2018).
(Continued)

*Primary Examiner* — Jennifer D Bennett
(74) *Attorney, Agent, or Firm* — McDonnell Boehnen Hulbert & Berghoff LLP

(57) ABSTRACT

Example embodiments relate to selective deactivation of light emitters for interference mitigation in light detection and ranging (lidar) devices. An example method includes deactivating one or more light emitters within a lidar device during a firing cycle. The method also includes identifying whether interference is influencing measurements made by the lidar device. Identifying whether interference is influencing measurements made by the lidar device includes determining, for each light detector of the lidar device that is associated with the one or more light emitters deactivated during the firing cycle, whether a light signal was detected during the firing cycle.

20 Claims, 18 Drawing Sheets

Related U.S. Application Data continuation of application No. 16/916,031, filed on Jun. 29, 2020, now Pat. No. 11,561,281.

(51) Int. Cl.
*G01S 7/499* (2006.01)
*G01S 17/10* (2020.01)
*G01S 17/42* (2006.01)
*G01S 17/931* (2020.01)

(52) U.S. Cl.
CPC .............. *G01S 7/499* (2013.01); *G01S 17/10* (2013.01); *G01S 17/42* (2013.01); *G01S 17/931* (2020.01)

(56) References Cited

U.S. PATENT DOCUMENTS

| | | | |
|---|---|---|---|
| 7,499,775 | B2 | 3/2009 | Filippov et al. |
| 9,989,629 | B1 | 6/2018 | LaChapelle |
| 10,241,198 | B2 | 3/2019 | LaChapelle et al. |
| 10,295,668 | B2 | 5/2019 | LaChapelle et al. |
| 10,365,351 | B2 | 7/2019 | Ingram et al. |
| 11,561,281 | B2 | 1/2023 | Shand |
| 11,960,029 | B2 * | 4/2024 | Shand .................. G01S 7/4804 |
| 2011/0063437 | A1 | 3/2011 | Watanabe et al. |
| 2015/0062555 | A1 * | 3/2015 | Kim ...................... G01S 17/87 356/4.01 |
| 2018/0259645 | A1 | 9/2018 | Shu et al. |
| 2019/0011567 | A1 * | 1/2019 | Pacala .................. G02B 27/30 |
| 2019/0079172 | A1 | 3/2019 | Field et al. |
| 2019/0277953 | A1 | 9/2019 | Li et al. |
| 2019/0285732 | A1 | 9/2019 | Retterath et al. |
| 2020/0200873 | A1 | 6/2020 | Schmidt |
| 2020/0209355 | A1 * | 7/2020 | Pacala .................... G01S 7/484 |
| 2021/0033711 | A1 | 2/2021 | Helsloot et al. |
| 2021/0096262 | A1 | 4/2021 | Vets |
| 2021/0103055 | A1 | 4/2021 | Allen et al. |
| 2021/0149028 | A1 | 5/2021 | Gong et al. |
| 2021/0247499 | A1 * | 8/2021 | Zhu ....................... G01S 7/4863 |
| 2021/0293929 | A1 * | 9/2021 | Dong .................... G01S 7/487 |
| 2022/0035011 | A1 | 2/2022 | Pacala |

FOREIGN PATENT DOCUMENTS

| | | |
|---|---|---|
| EP | 2174531 B1 | 4/2010 |
| EP | 3391084 A2 | 7/2017 |
| GB | 2419430 B | 10/2005 |
| JP | H06242240 A | 9/1994 |
| JP | 2001-255371 A | 9/2001 |
| JP | 2016-57141 A | 4/2016 |
| JP | 2017125682 A | 7/2017 |
| JP | 2019504326 A | 2/2019 |
| JP | 2019516101 A | 6/2019 |
| JP | 2022-550200 A | 11/2022 |
| KR | 20140144611 A | 12/2014 |
| WO | 2016/091625 A1 | 6/2016 |
| WO | 2018/055513 A2 | 3/2018 |
| WO | 2019/197894 A1 | 10/2019 |

OTHER PUBLICATIONS

"A Survey of Autonomous Driving: Common Practices and Emerging Technologies"; Ekim Yurtsever, et al.; IEEE Access, vol. 8, pp. 58443-58469 (Apr. 2, 2020).

International Search Report and Written Opinion for International Patent Application No. PCT/US2021/035666; mailed Sep. 17, 2021 (7 Pages).

* cited by examiner

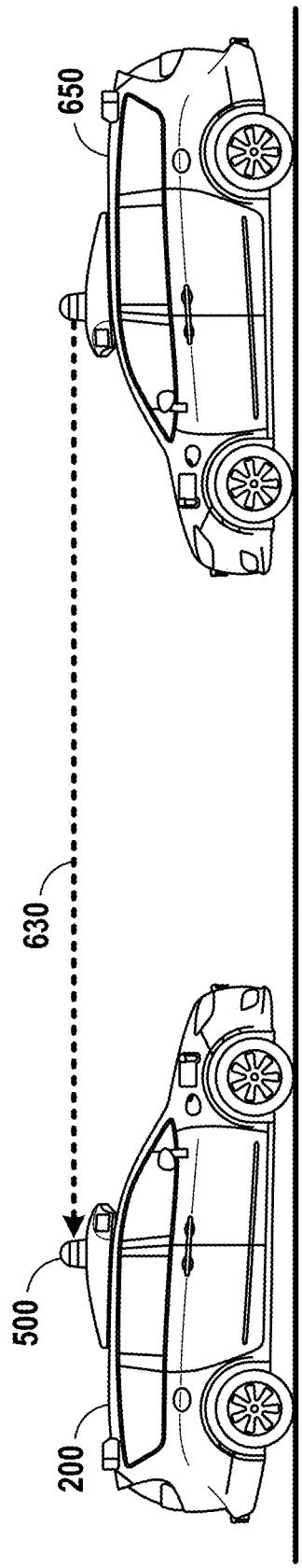
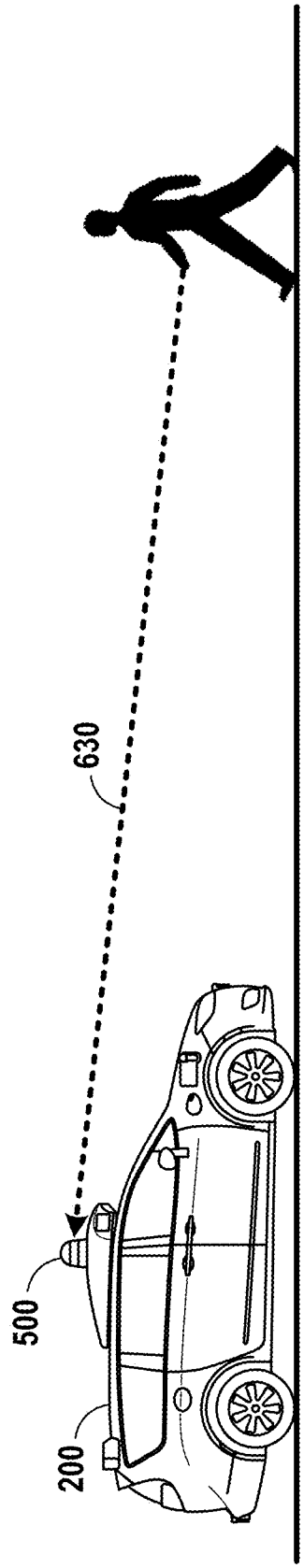

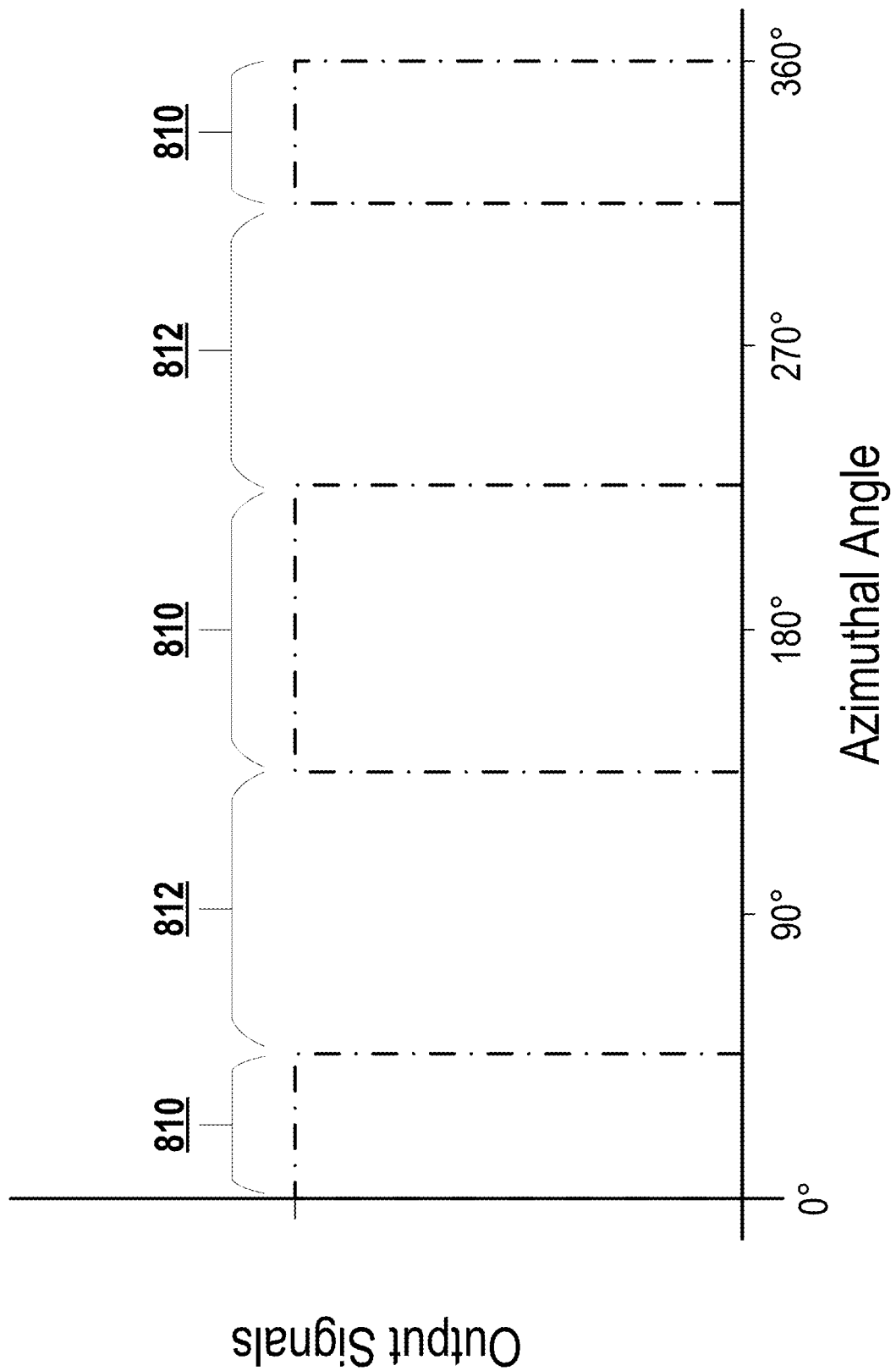

SELECTIVE DEACTIVATION OF LIGHT EMITTERS FOR INTERFERENCE MITIGATION IN LIGHT DETECTION AND RANGING (LIDAR) DEVICES

CROSS-REFERENCE TO RELATED APPLICATIONS

This application is a continuation of U.S. patent application Ser. No. 18/068,665, filed Dec. 20, 2022; which is a continuation of U.S. patent application Ser. No. 16/916,031, filed Jun. 29, 2020 and issued as U.S. Pat. No. 11,561,281 on Jan. 24, 2023. The foregoing applications are incorporated herein by reference in their entireties.

BACKGROUND

Unless otherwise indicated herein, the materials described in this section are not prior art to the claims in this application and are not admitted to be prior art by inclusion in this section.

Autonomous vehicles or vehicles operating in an autonomous mode may use various sensors to detect their surroundings. For example, light detection and ranging (lidar) devices, radio detection and ranging (radar) devices, and/or cameras may be used to identify objects in environments surrounding autonomous vehicles. Such sensors may be used in object detection and avoidance and/or in navigation, for example.

A lidar device can determine distances to environmental features while scanning through a scene to collect data that can be assembled into a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

The disclosure relates to techniques for detecting external interference with lidar measurements (e.g., malicious interference from a nefarious individual or inadvertent interference from another lidar device). Techniques described herein include deactivating one or more light emitters during a time period when the light emitters would otherwise be emitting light signals. Thereafter, if light signals are detected by corresponding light detectors within a corresponding detection period, interference is identified as influencing measurements made by the lidar device. If interference is identified as influencing measurements made by the lidar device, appropriate action may be taken thereafter (e.g., putting the lidar device into a degraded-state mode, decommissioning the lidar device, removing points from a point cloud that correspond to light detectors where interference has been determined to influence measurements, etc.).

In one aspect, a method is provided. The method includes deactivating one or more light emitters within a light detection and ranging (lidar) device during a firing cycle. The method also includes identifying whether interference is influencing measurements made by the lidar device. Identifying whether interference is influencing measurements made by the lidar device includes determining, for each light detector of the lidar device that is associated with the one or more light emitters deactivated during the firing cycle, whether a light signal was detected during the firing cycle.

In another aspect, a light detection and ranging (lidar) device is provided. The lidar device includes an array of light emitters. The lidar device also includes an array of light detectors. Each of the light detectors is associated with one or more light emitters in the array of light emitters. In addition, the lidar device includes a controller. The controller is configured to cause one or more light emitters in the array of light emitters to be deactivated during a firing cycle. The controller is also configured to identify whether interference is influencing measurements made by the lidar device. Identifying whether interference is influencing measurements made by the lidar device includes determining, for each light detector of the lidar device that is associated with the one or more light emitters deactivated during the firing cycle, whether a light signal was detected during the firing cycle.

In an additional aspect, a non-transitory, computer-readable medium having instructions stored thereon is provided. The instructions, when executed by a processor, perform a method. The method includes causing one or more light emitters of a light detection and ranging (lidar) device to be deactivated during a firing cycle. The method also includes identifying whether interference is influencing measurements made by the lidar device. Identifying whether interference is influencing measurements made by the lidar device includes determining, for each light detector of the lidar device that is associated with the one or more light emitters deactivated during the firing cycle, whether a light signal was detected during the firing cycle.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6D is an illustration of inadvertent interference influencing measurements of a lidar device, according to example embodiments.

FIG. 6E is an illustration of malicious interference influencing measurements of a lidar device, according to example embodiments.

FIG. 8B is a graphical representation of selective deactivation of one or more light emitters in a lidar device based on regions of disinterest.

DETAILED DESCRIPTION

Figure 1:
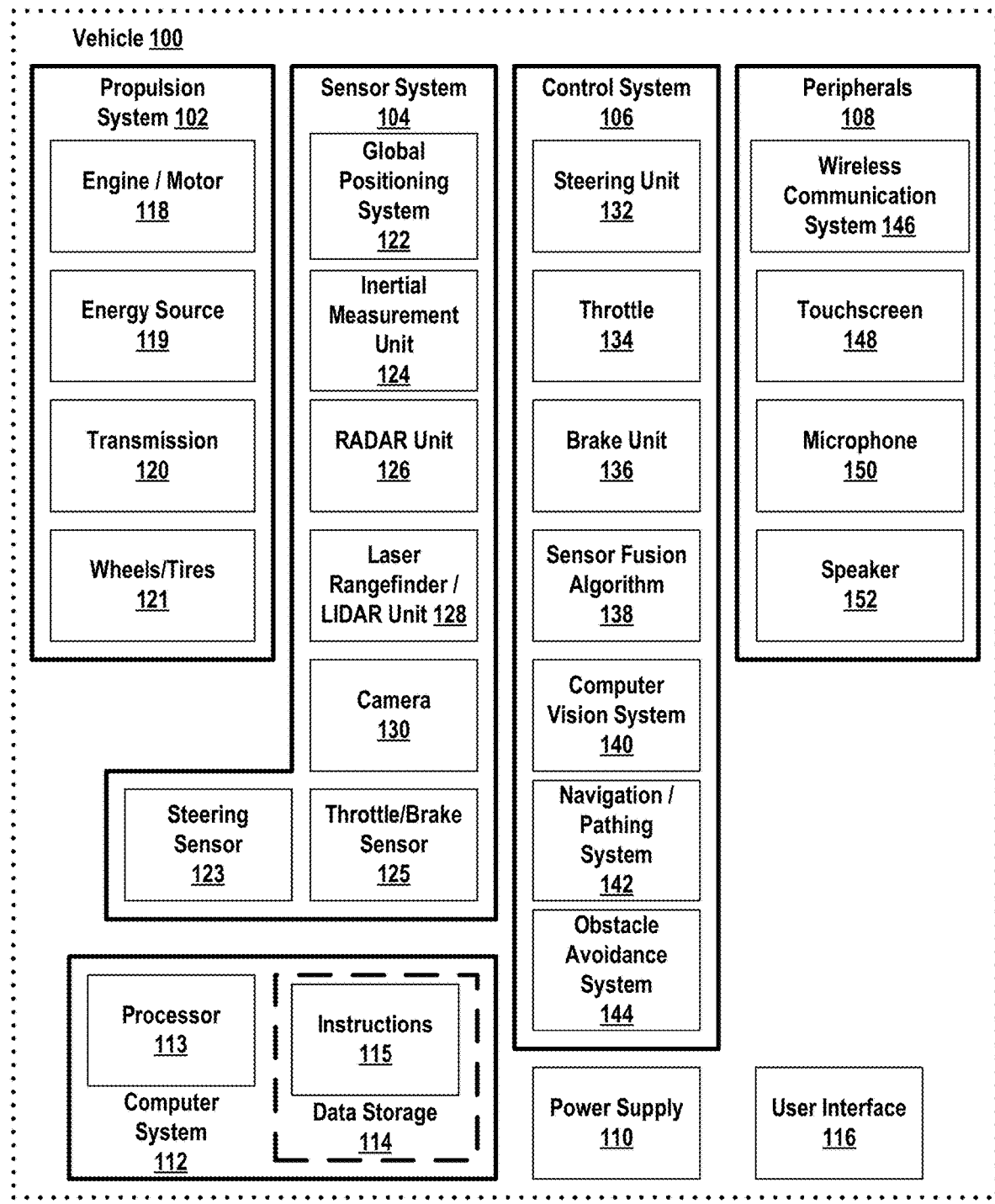
FIG. 1 is a functional block diagram illustrating a vehicle, according to example embodiments.
Figure 2A:
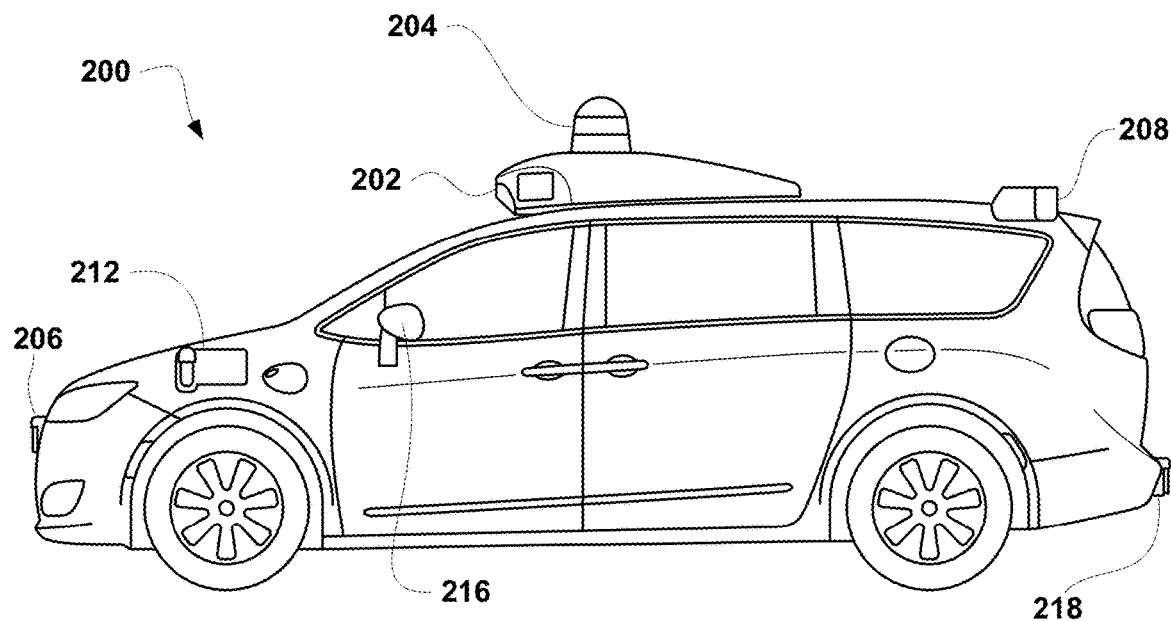
FIG. 2A is an illustration of a physical configuration of a vehicle, according to example embodiments.
Figure 2B:
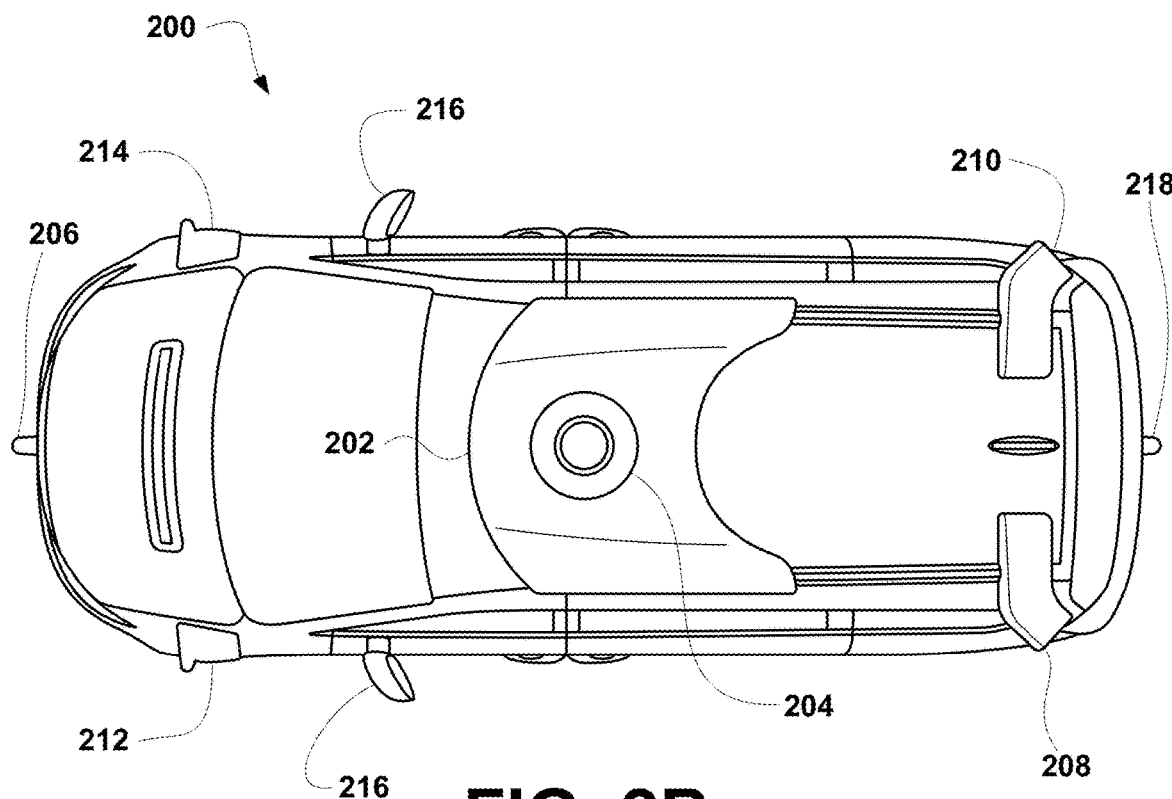
FIG. 2B is an illustration of a physical configuration of a vehicle, according to example embodiments.
Figure 2C:
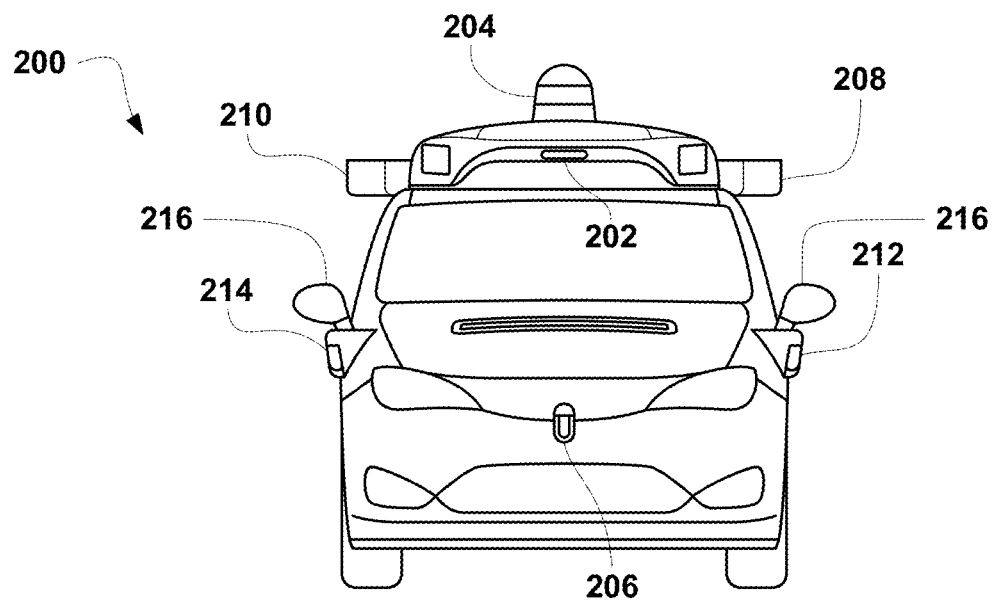
FIG. 2C is an illustration of a physical configuration of a vehicle, according to example embodiments.
Figure 2D:
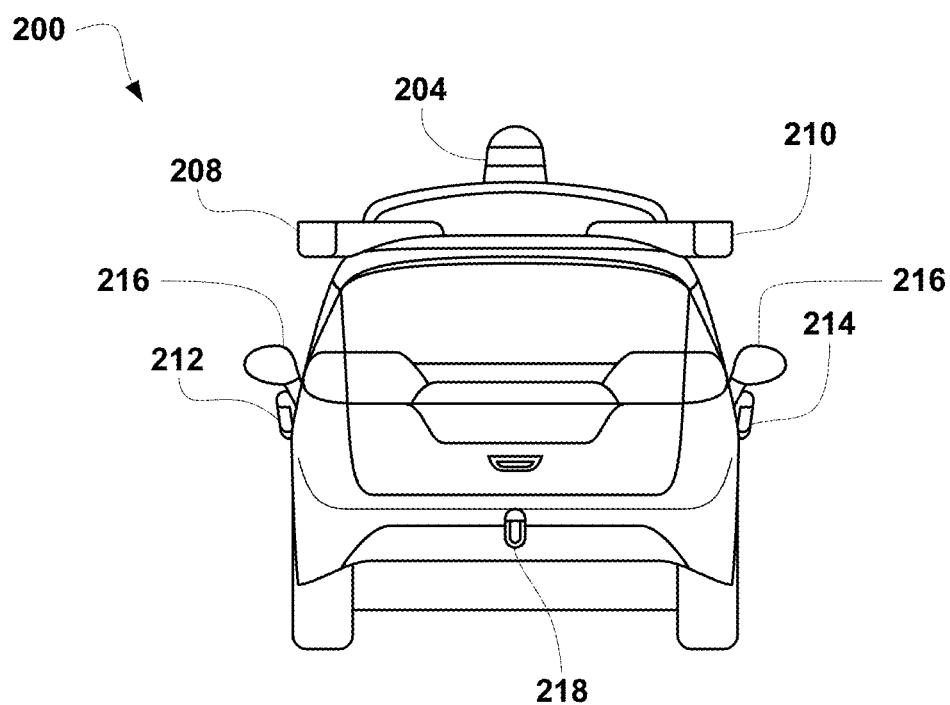
FIG. 2D is an illustration of a physical configuration of a vehicle, according to example embodiments.
Figure 2E:
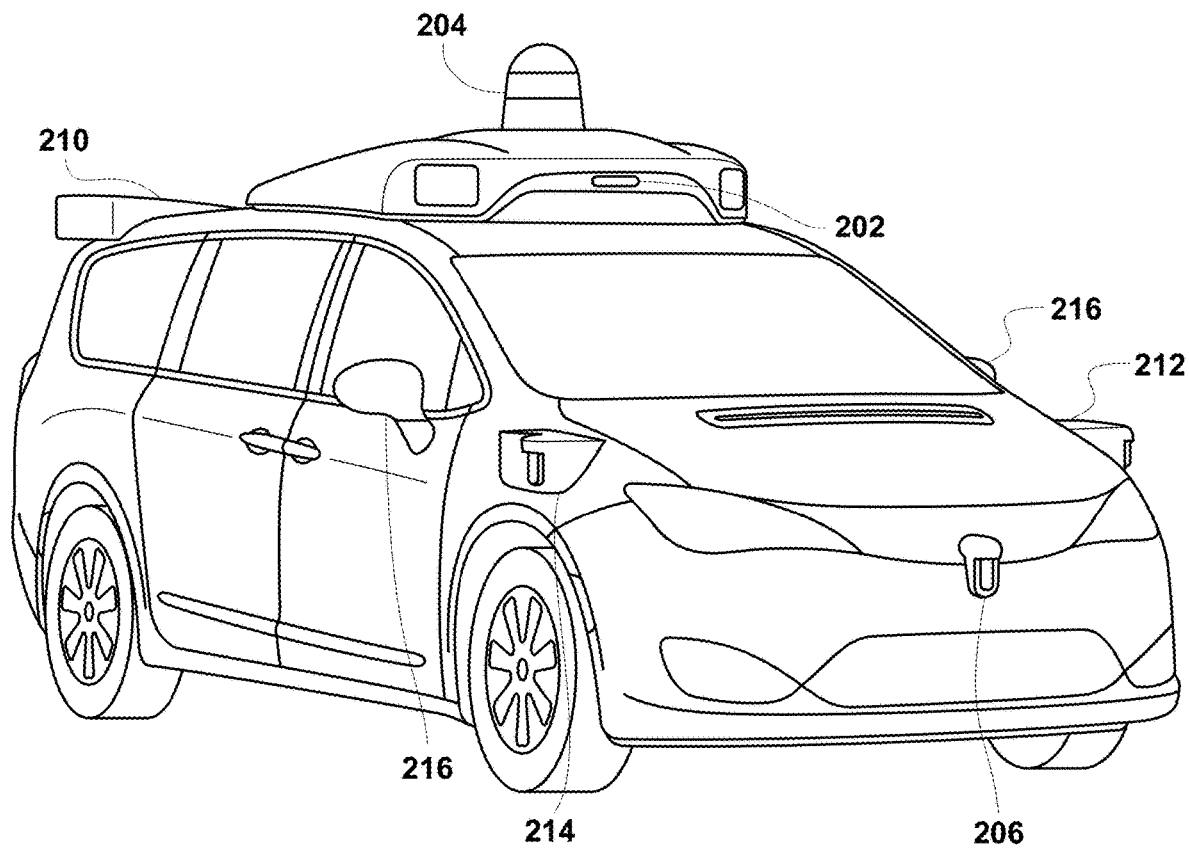
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

In example embodiments, lidar devices may include one or more light emitters (e.g., laser diodes) and one or more light detectors (e.g., silicon photomultipliers (SiPMs), SPADs, APDs, etc.). For example, an example lidar device may include an array of light emitters and a corresponding array of light detectors. Such arrays may illuminate objects in the scene and receive reflected light from objects in the scene so as to collect data that may be used to generate a point cloud for a particular angular field of view relative to the lidar device. Further, to generate a point cloud with an enhanced field of view (e.g., a complete 360° field of view), the array of light emitters and the corresponding array of light detectors may send and receive light at predetermined times and/or locations within that enhanced field of view. For example, the lidar device may include an array of light emitters and a corresponding array of light detectors arranged around the vertical axis such that light is transmitted and received in multiple directions around the 360° field of view simultaneously. As another example, a lidar device may scan, e.g., be rotated or use other mechanisms to beam scan, about a central axis to transmit/receive multiple sets of data. The data can be used to form point clouds that can be composited to generate the enhanced field of view. In some embodiments, the arrays of light emitters/corresponding light detectors may not have uniform density. For example, certain portions of the arrays might have an increased density of light emitters/light detectors when compared to the other portions of the arrays. This may allow for increased resolution in certain portions of the point cloud of the field of view. For example, a central region of the point cloud may have higher density than peripheral regions of the point cloud by arranging the array of the light emitters/light detectors in a configuration that enables a higher density of beams at the central regions as compared to other regions). For example, one configuration may have higher density of light emitters/light detectors in central portions of the arrays when compared to the periphery. See also, U.S. Pat. No. 10,365,351.

Lidar devices, however, may be susceptible to interference. For example, light signals originating from light sources other than the light emitters of the lidar device may be inadvertently detected by the light detectors and identified as objects in the surrounding scene (e.g., false positives may be included in a point cloud generated using the detection data from the lidar device). In particularly egregious situations, such interference may impact control decisions for an autonomous vehicle making use of the lidar device. For example, if point cloud data indicates that there is an object in front of the lidar device when in fact there is not, the autonomous vehicle may choose to remain stopped. However, in this scenario, there is no object in front of the lidar device in actuality and, therefore, the autonomous vehicle does not need to remain stopped and should, instead, continue on the prescribed route. Other examples of control decisions that may be impacted by interference are also possible (e.g., indecisive speed, unnecessary avoidance maneuvers, etc.).

Described herein are techniques for detecting the presence of interference with the lidar device. One such technique may include selectively deactivating one or more of the light emitters for one or more firing cycles while leaving the light detector(s) corresponding to the deactivated light emitters enabled (e.g., selectively deactivating 1%, 5%, 10%, 15%, 20%, 25%, 30%, 35%, 40%, 45%, 50%, 55%, 60%, 65%, etc. of the light emitters while leaving the corresponding light detector(s) enabled). If the corresponding light detector(s) still detect a signal, even without a signal being transmitted by the light emitter(s), then in one embodiment, the system may conclude that interference with that particular light emitter/light detector combination is occurring.

Such interference may originate from a variety of sources. For example, other lidar devices in the vicinity of the lidar device may emit light signals within a similar wavelength range as the light emitters of the lidar device (e.g., about 905 nm, about 940 nm, about 1310 nm, about 1350 nm, about 1450 nm, about 1470 nm, or about 1550 nm). Such other lidar devices may be attached to vehicles within the same fleet of vehicles as the present lidar device. Alternatively, such other lidar devices may be attached to vehicles within a different fleet of vehicles than the present lidar device. In other cases such other lidar devices may be attached to other structures, such as buildings or traffic lights, that the present lidar device passes by. In other cases, malicious interference may be present (e.g., someone with malicious intent may be attempting to adversely impact the operation of the lidar device or an associated vehicle using a light source that emits light at the wavelength of the light emitters of the lidar device).

The light emitters that are selectively deactivated for the purpose of interference detection may be selected for deactivation based on regions of disinterest. In some embodiments, those channel(s) or regions of a generated point cloud that are used for interference detection may be used for interference detection because the results they would receive if actual detections occurred would be less useful than the results that could be received by other channel(s) in the lidar device or other regions of a generated point cloud (i.e., those channels correspond to "regions of disinterest"). For example, if some of the light emitters are firing light signals at portions of a surrounding environment about which less information can be gleaned or less information can be used, those light emitters may be deactivated, at least temporarily, for the purpose of interference detection. Selecting regions of disinterest for the purpose of interference detection may be based on one or more of the following criteria: certain directions relative to an autonomous vehicle equipped with the lidar device may be less interesting than other directions relative to the autonomous vehicle (e.g., regions behind the vehicle may be less interesting than regions in front of the vehicle, regions to the side of the vehicle may be less interesting than regions to the front of the vehicle, or regions above the vehicle may be less interesting than regions below the vehicle); specific locations in the surrounding environment according to two-dimensional or three-dimensional map data (e.g., regions near pedestrian crosswalks or traffic signals may be more interesting than other regions); information from other sensors (e.g., if a corresponding radar device or a camera is able to detect an object in a scene, the region corresponding to the position of the object in the scene relative to the lidar device may be less interesting than other regions in the scene or, similarly, regions of the scene where a field of view of a corresponding radar device or camera are obscured may be more interesting than other regions of the scene); data related to season, date, and/or time of day (e.g., springtime, holiday, or noon); data relating to location and/or event (e.g., highways segments with long straightaways and/or the end of a concert or sporting event); data from other fleet vehicles; data from a remote server; historical data (e.g., a time of day or year with historically common people/animal crossing at a certain location); control data corresponding to a vehicle associated with the lidar device (e.g., if the vehicle is turning left, regions of the scene to the left of the vehicle may be more interesting than regions to the right of the vehicle); terrain (e.g., when the lidar device is traveling up or downhill, regions oriented at high or low altitudinal angles may correspond to regions of disinterest); weather (e.g., in cases of snow, a region of disinterest may be a region directly behind a vehicle associated with the lidar device); etc. Other information may be used in identifying regions of disinterest for use in interference detection, as well.

In addition to or instead of identifying regions of disinterest for selective deactivation for interference detection, channels may be deactivated randomly or pseudo-randomly. For example, a list of light emitters within an array of light emitters of the lidar device may be pseudo-randomly selected for deactivation by a computing device (e.g., a controller of the lidar device or a control system of an associated vehicle). The computing device may store the pseudo-randomly generated list for later use in determining interference by using the pseudo-randomly generated list in conjunction with the generated point cloud based on the detections of the light detectors in the lidar device. The pseudo-randomly generated list may include contiguous sets of light emitters within the array of light emitters or, alternatively, may include a patchwork pattern of light emitters. A patchwork pattern may enhance disambiguation when it comes to identifying interference. In other embodiments, rather than a computing device pseudo-randomly generating the list of deactivated light emitters, the list may be generated by a circuit (e.g., using a linear shift register, a feedback shift register, a one way hash function, and/or a cryptographic circuit). In some cases, a computing device (e.g., a controller used to control the autonomous vehicle or lidar device) may seed a pseudo-random generator of the circuit. This seed could be used later to reconstruct the exact pseudo-random sequence used to deactivate the light emitters (e.g., to more readily identify within historical data which channels were being used for interference detection).

If interference is detected, certain control actions may be taken as a result. For example, the lidar device and/or an associated autonomous vehicle could be placed into a degraded-state mode. The degraded-state mode could cause an autonomous vehicle to pull over, slow down, park, return to base, etc. Additionally or alternatively, if interference is detected, the data captured using the lidar device may be flagged with one or more pieces of metadata that indicate that the data may have been influenced by interference and that possible inaccuracies may be present. More drastically, in some embodiments, points within a point cloud that are determined to be influenced by interference may simply be removed from the point cloud before the point cloud is used to make any control decisions (e.g., for a corresponding autonomous vehicle).

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., O₂ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors. In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
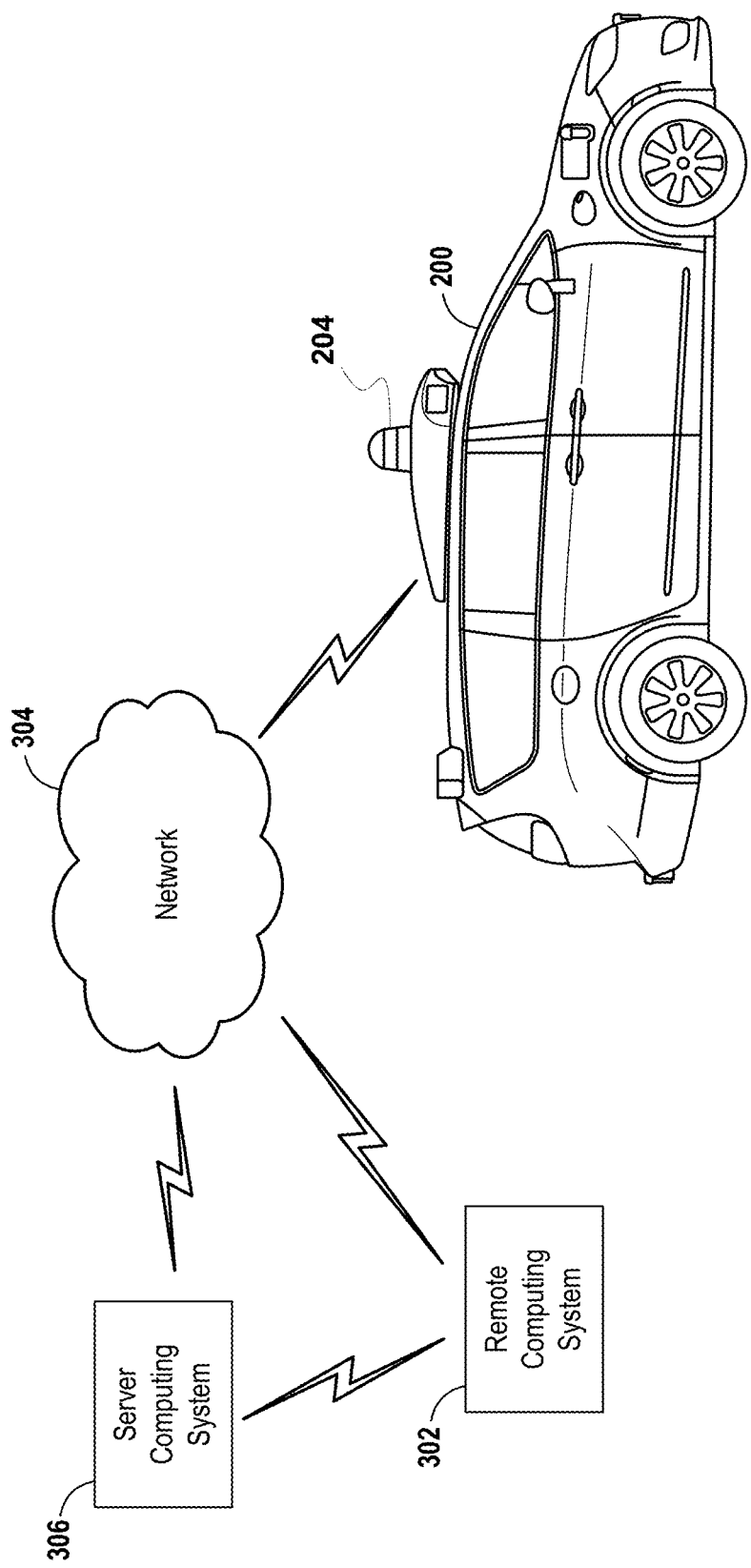
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
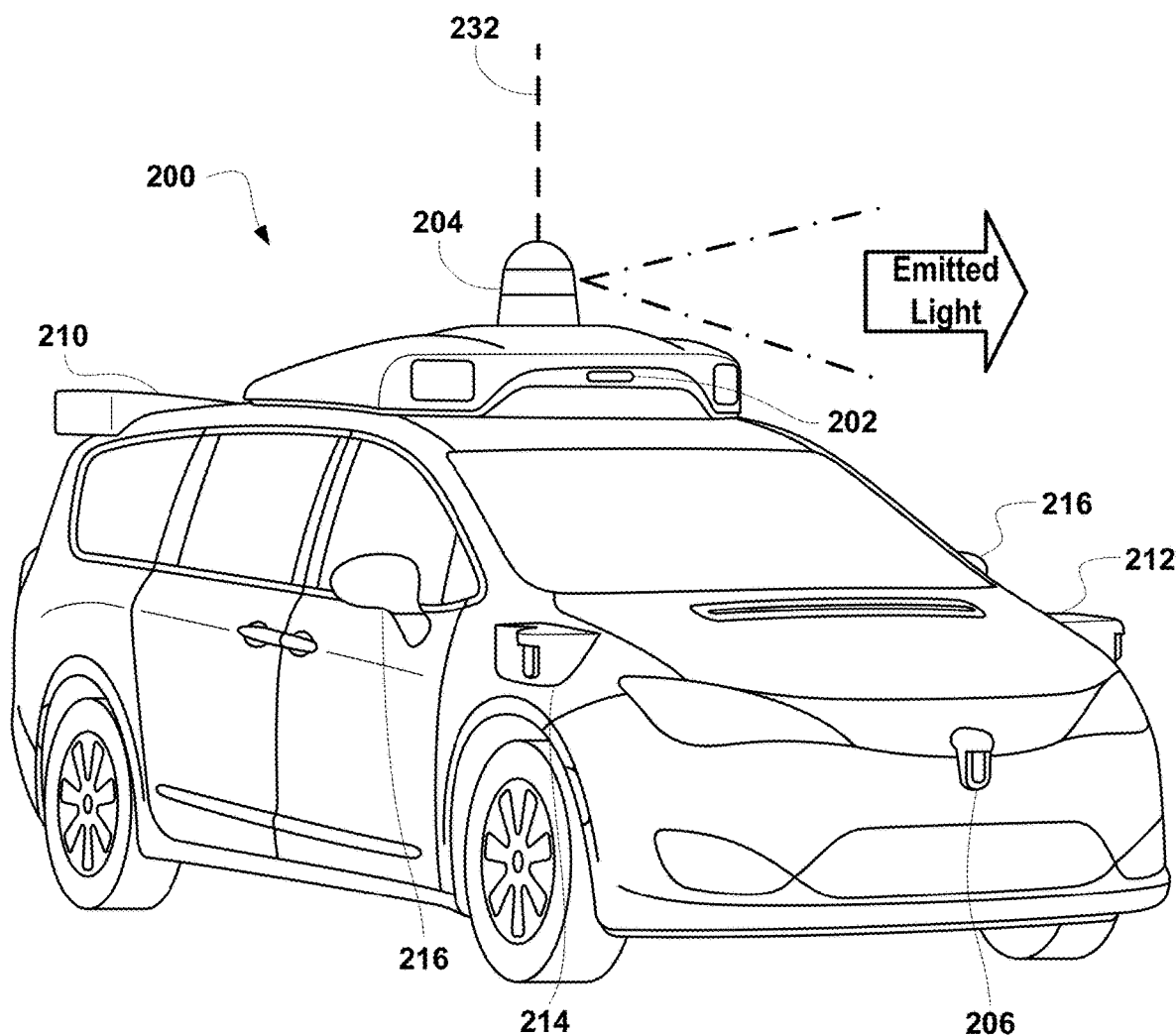
FIG. 4 illustrates an example operation of a lidar device, according to example embodiments.

FIG. 4 illustrates a vehicle (e.g., the vehicle 200 illustrated in FIGS. 2A-2E) equipped with a lidar device (e.g., the first lidar unit 204 illustrated in FIGS. 2A-2E), according to example embodiments. Although the vehicle 200 is illustrated as an automobile, as noted above, other types of vehicles are possible. Furthermore, although the vehicle 200 is shown as a vehicle that may be configured to operate in autonomous mode, the embodiments described herein are also applicable to vehicles that are not configured to operate autonomously.

FIG. 4 shows that the first lidar unit 204 may be configured to scan an environment around the vehicle 200 about vertical axis 232 while emitting one or more light pulses and detecting reflected light pulses off objects in an environment of the vehicle 200, for example.

Thus, as shown, the first lidar unit 204 may emit light in a pointing direction of the first lidar unit 204, which is shown in FIG. 4 as a pointing direction toward a right side of the page for example. With this arrangement, the first lidar unit 204 can emit light toward regions of the environment that are relatively close to the vehicle 200 (e.g., a nearby road sign) as well as toward regions of the environment that are further away from the vehicle (e.g., a road sign well ahead of the vehicle). Thus, for each complete scan of the first lidar unit 204 (or one or more components thereof) around axis 232, the first lidar unit 204 can obtain a 360° FOV around the vehicle 200.

Figure 5:
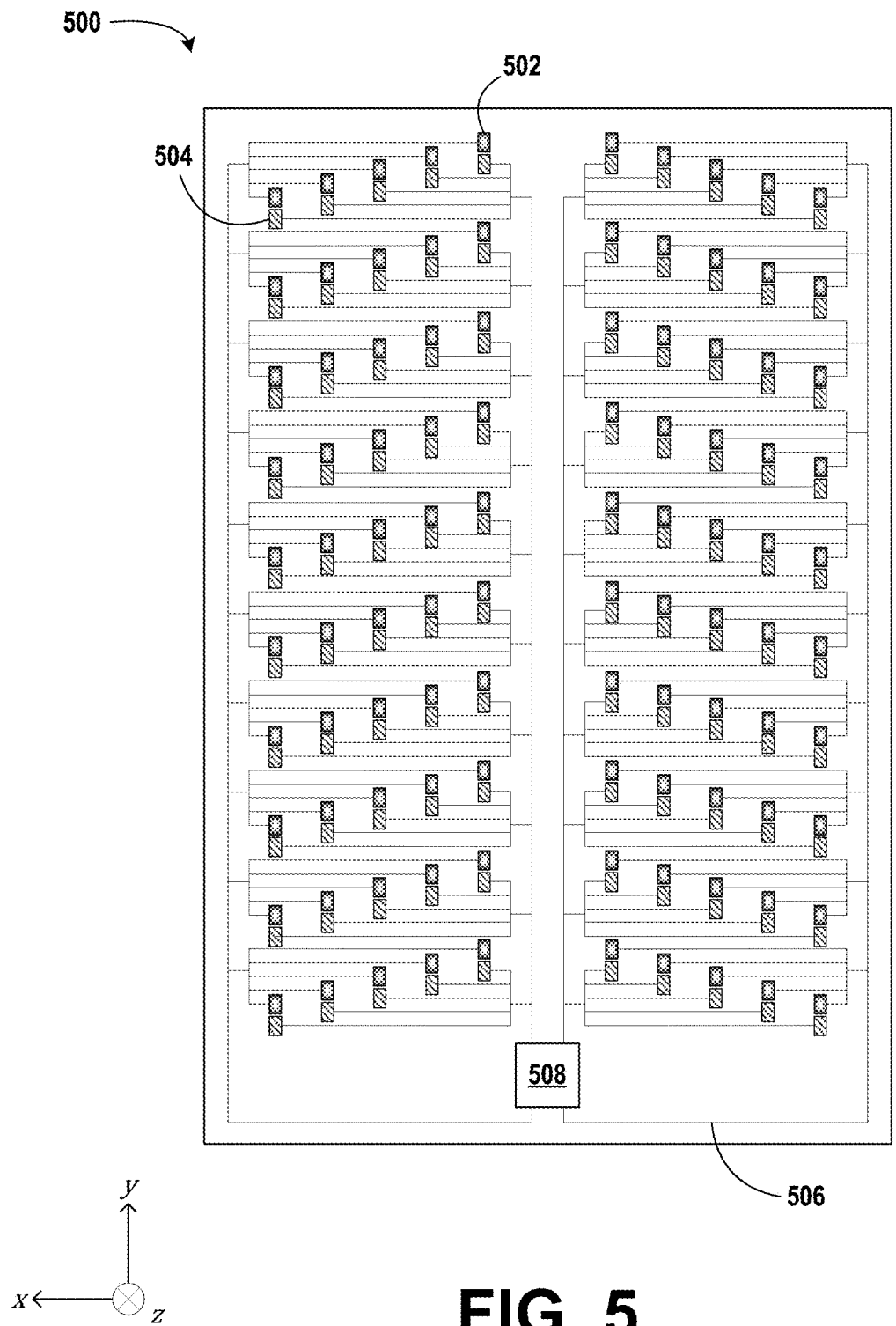
FIG. 5 is a front-view illustration of a lidar device, according to example embodiments.

FIG. 5 is an illustration of a lidar device 500 (e.g., the first lidar unit 204 illustrated in FIG. 4). Similar to the lidar unit 204 illustrated in FIG. 4, the lidar device 500 in FIG. 5 may be used to sense one or more objects in an environment surrounding the lidar device 500 (e.g., for the purpose of object detection and avoidance within an autonomous vehicle). Based on the time delay between emission times of light signals and detection times of those light signals, a distance to an object in the environment may be determined. In order to identify the distance to multiple objects in the environment, the lidar device 500 may include one or more actuators that are configured to rotate, adjust, or otherwise move the light emitters and detectors (e.g., in an azimuthal direction and/or elevation direction). For example, the actuators may azimuthally rotate light emitters and/or detectors such that a 360° field of view is observed. Other mechanisms, such as beam steering, may additionally or alternatively be used to scan in 360° around the vehicle. As the actuator(s) or other mechanisms steer the transmit light, e.g., from the light emitters, distances to different regions of the surrounding environment may be determined by detecting the reflected light, e.g., as a series of light signals. Such distances may be amalgamated into a point cloud (e.g., a three-dimensional point cloud) that represents the surrounding environment. The point cloud may be generated on-board the lidar device 500 from the determined distances. Additionally or alternatively, the point cloud may be generated using a separate computing device (e.g., a connected or networked computing device, such as a server device) based on the determined distances.

As illustrated, the lidar device 500 may include an array of one or more light emitters 502, a corresponding array of one or more light detectors 504, conductive traces 506, and a control circuit 508 (e.g., a control circuit 508 that includes a controller). It is understood that the components illustrated in FIG. 5 may represent only a portion of the components of the lidar device 500. For example, the lidar device 500 may also include one or more waveguides, one or more optical filters (e.g., chromatic filters or polarization filters), one or more mirrors, one or more lenses, one or more power sources, etc. Further, while one hundred light emitters 502 arranged into groups of five light emitters 502 and a corresponding one hundred light detectors 504 arranged into groups of five light detectors 504 are illustrated in FIG. 5, it is understood that this configuration is only provided as an example. Other numbers of light emitters 502 and/or light detectors 504 and/or other arrangements of light emitters 502 and/or light detectors 504 may be present within the lidar device 500, all of which are contemplated herein. For example, some embodiments may only include a single light emitter 502 and a single light detector 504. In such embodiments, the single light emitter 502 and the corresponding single light detector 504 may be moved (e.g., rotated and/or pivoted by one or more actuators) to achieve a 360° azimuthal field of view and/or to achieve a 180° elevation field of view. In some embodiments, a rotating mirror may be used additionally or alternatively to redirect the light emitted from the light emitter 502 and/or received from the environment.

Each of the light emitters 502 may correspond to one of the light detectors 404. For example, a light detector 504 may receive a light signal emitted by a corresponding light emitter 502 once the light signal has been reflected from one or more objects in a surrounding environment. As illustrated in FIG. 5, a light detector 504 corresponding to a given light emitter 502 may be positioned on a substrate of the lidar device 500 below the light emitter 502 (i.e. at a slightly lower y-position, as illustrated). In other embodiments, corresponding light detectors 504 may be positioned above, to the left of, to the right of, or in wholly different locations from the corresponding light emitters 502. In other embodiments, multiple light emitters 502 may correspond to a single light detector 504 or multiple light detectors 504 may correspond to a single light emitter 502.

The light emitters 502 in the array may include light sources such as laser diodes. In some embodiments, the light emitters 502 may include pulsed light sources. For example, the light sources may include one or more pulsed lasers (e.g., a Q-switched laser). In alternate embodiments, a continuous wave (CW) light source may be used. In some embodiments, the light emitters 502 may include a fiber laser coupled to an optical amplifier. In particular, the fiber laser may be a laser in which an active gain medium (i.e., source of optical gain within the laser) is in an optical fiber. Moreover, the fiber laser could be arranged in various ways within lidar device 500. In still other embodiments, however, one or more light emitters 502 in the array may additionally or alternatively include light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), and/or any other device configured to selectively transmit, reflect, and/or emit light to provide emitted light beams and/or pulses. The light emitters 502 may be configured to emit light signals toward objects in a surrounding environment that, when reflected by such objects, can be detected by detectors to determine a distance between the lidar device 500 and the respective object.

The wavelength range emitted by the light emitters 502 could, for example, be in the ultraviolet, visible, and/or infrared portions of the electromagnetic spectrum. In some examples, the wavelength range can be a narrow wavelength range, such as is provided by lasers. In some embodiments, the wavelength range includes wavelengths that are about 905 nm (e.g., between 900 nm and 910 nm), about 940 nm (e.g., between 935 nm and 945 nm), or about 1550 nm (e.g., between 1545 nm and 1555 nm). It is noted that these wavelengths are provided only as examples and are not meant to be limiting.

Light signals (e.g., light pulses) emitted by the light emitters 502 in the array may be guided, redirected, focused, collimated, filtered, reflected, refracted, and/or otherwise adjusted prior to being transmitted into the surrounding environment. This may allow the light signals to be directed across a range of azimuthal angles and/or elevation angles (e.g., to interrogate a corresponding range of angles within the surrounding environment). For example, based on the array of (x,y) positions of the light emitters 502 in the lidar device 500 (e.g., as illustrated in FIG. 5), each light signal transmitted may be directed to a different azimuthal angle and/or elevation angle (e.g., based on other optics of the lidar device 500, such as lenses or mirrors).

The light detectors 504 may include various types of detectors (e.g., single-photon detectors). For example, the light detectors 504 may include SPADs and/or SiPMs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In some embodiments, the light detectors 504 may be biased above an avalanche breakdown voltage. Such a biasing condition may create a positive feedback loop having a loop gain that is greater than one. In addition, SPADs biased above the threshold avalanche breakdown voltage may be single-photon sensitive. Additionally or alternatively, the light detectors 504 may include linear-mode APDs, also referred to as APDs. In other examples, the light detectors 504 may include photoresistors, charge-coupled devices (CCDs), photovoltaic cells, and/or any other type of light detector.

In some implementations, the array of light detectors 504 may include more than one type of light detector across the array. For example, the array of light detectors 504 can be configured to detect multiple different wavelengths of light (e.g., in embodiments where the light emitters 502 emit different wavelengths of light across the array of light emitters 502). To that end, for example, the array of light detectors 504 may include some SPADs that are sensitive to one range of wavelengths and other SPADs that are sensitive to a different range of wavelengths. In some embodiments, the light detectors 504 may be sensitive to wavelengths between 400 nm and 1.6 μm (visible and/or infrared wavelengths). Further, the light detectors 504 may have various sizes and shapes. In some embodiments, each of the light detectors 504 may include a micro-lens positioned over the light detector 504 to enhance the amount of received light that is transmitted to a detection surface of the light detector 504. Additionally or alternatively, one or more of the light detectors 504 may include one or more optical filters (e.g., neutral-density filter(s), polarization filter(s), and/or chromatic filter(s)).

As described above, in some embodiments, each of the light detectors 504 may correspond to a respective light emitter 502 in the lidar device 500. In other embodiments, multiple light detectors 504 may correspond to a single light emitter 502 or a single light detector 504 may correspond to multiple light emitters 502. As with the light emitters 502 illustrated in FIG. 5, the number and position of the light detectors 504 in FIG. 5 is provided solely as an example. Other numbers and positions for both the light emitters 502 and the light detectors 504 are also possible and are contemplated herein.

As described above, the light emitters 502 may be configured to transmit light signals to a surrounding environment (e.g., based on the position and characteristics of corresponding lenses and/or mirrors within the lidar device 500) across a range of azimuthal and/or elevation angles. Similarly, based on the positions of the light detectors 504 within the lidar device 500, the light detectors 504 may be arranged to receive light signals reflected from objects in the environment surrounding the lidar device 500 across the same range of azimuthal and/or elevation angles.

In some embodiments, the light emitters 502 and/or corresponding light detectors 504 may be separated by a sufficient distance within the lidar device 500 so as to prevent crosstalk (e.g., to prevent cross-coupling of light signals between adjacent transmit/receive channels). Preventing crosstalk may prevent self-induced interference. Additionally or alternatively, in some embodiments, one or more baffles may be positioned between adjacent light emitters 502 and/or light detectors 504. The baffles may be opaque to one or more wavelengths of the light signals emitted by the light emitters 502. Such baffles may also prevent crosstalk between channels (e.g., on both the transmit side and the receive side).

The array of light emitters 502 and/or the array of light detectors 504 may be powered by and/or controlled by the control circuit 508. As illustrated, the control circuit 508 may be connected to one or more of the light emitters 502 and/or one or more of the light detectors 504 by conductive traces 506 (or other wired or wireless connections) defined in the lidar device 500. The control circuit 508 may include a controller (e.g., a general-purpose processor or an application-specific integrated circuit (ASIC)), a firing circuit, a memory (e.g. a read-only memory (ROM) or a random-access memory (RAM)), and/or a power source to control the light emitters 502 and light detectors 504, in various embodiments. For example, in some embodiments, the control circuit 508 may include one or more capacitors. Such capacitors may be charged by one or more power supplies. Then, to cause the light emitters 502 to emit light signals (i.e., to "fire"), the stored energy in the capacitors may be discharged through the light emitters 502. In some embodiments, the control circuit 508 may cause the light emitters 502 to emit light signals simultaneously with one another. In other embodiments, the control circuit 508 may cause the light emitters 502 to emit light signals sequentially (e.g., repeatedly at predetermined intervals according to a firing sequence). Components within the control circuit 508 other than those described above are also possible and are contemplated herein.

As used herein, the term "firing sequence" may represent the order in which a series of light emitters (e.g., the light emitters 502) within a lidar device (e.g., the lidar device 500) are fired. A "firing sequence" may include one or more "firing cycles," where the "firing cycles" represent time segments during which one or more light emitters are fired and, thereafter, one or more corresponding light detectors listen for (i.e., attempt to detect) light signals reflected from the surrounding environment, if any. For example, a firing sequence may include multiple firing cycles and during each firing cycle, each of the light emitters is fired. Alternatively, a firing sequence may include alternating firing cycles of a first type and a second type, where, during the first type of firing cycle, a first half of the light emitters are fired and, during a second type of firing cycle, a second half of the light emitters are fired. A lidar device may also alternate being multiple firing sequences during operation. Further, in some embodiments, a lidar device or a corresponding computing device (e.g., a fleet management server, such as the server computing system 306 illustrated and described with reference to FIG. 3) may modify one or more firing sequences (e.g., by changing the number of firing cycles in the firing sequence, by changing which light emitters are fired during one or more of the firing cycles, by changing the duration of one of more of the firing cycles, and/or by changing the time delay between one or more firing cycles).

In some embodiments, a "firing sequence" may correspond to a predetermined amount of time (e.g., 200 ns, 500 ns, 700 ns, 1 µs, 1.5 µs, 2 µs, 3 µs, 5 µs, 8 µs, 10 µs, 15 µs, 20 µs, 50 µs, 100 µs, 1 ms, 1 s, etc.) or to a predetermined spatial observation area (e.g., a firing sequence represents the group of firing cycles executed for each rotation of the lidar device corresponding to a 360° azimuthal field of view or for each rotation of the lidar device corresponding to a 180° vertical field of view). Further, a "firing sequence" may include information like charging and discharging times for capacitors used to fire the light emitters in one or more of the firing cycles. In some embodiments, a "firing sequence" may be represented (e.g., stored within a memory) as a series of waveforms (e.g., a waveform for each light emitter, wherein the waveform represents the firing cycles for each light emitter).

According to a firing sequence and associated firing cycles, the control circuit 508 may be configured to fire each of the light emitters 502 individually, in subsets (e.g., subsets of two, three, four, five, six, seven, eight, nine, ten, etc. of the light emitters 502), and/or universally (i.e., all light emitters 502 within the lidar device 500 at once), depending on embodiment. Similarly, the control circuit 508 (e.g., a controller within the control circuit 508) may be configured to receive detection signals from each of the light detectors 504 individually, in subsets (e.g., subsets of two, three, four, five, six, seven, eight, nine, ten, etc. light detectors 504), and/or universally (i.e., a single aggregate signal is received from all light detectors 504 within the lidar device 500 at once), depending on embodiment.

Other firing sequences and firing cycles (including random and pseudo-random firing sequences) are also possible and contemplated herein. For example, the array of light emitters 502 may be divided into sub-arrays of light emitters (e.g., a first sub-array that corresponds to the light emitters 502 on the left side of the lidar device 500 and a second sub-array that corresponds to the light emitters 502 on the right side of the lidar device 500). The sub-arrays of light emitters 502 may be independently powered from one another. As such, the first sub-array of light emitters 502 and the second sub-array of light emitters 502 may be configured to be fired at different times from one another (e.g., the second sub-array of light emitters 502 may be fired at a delay with respect to a firing of the first sub-array of light emitters 502, or vice versa). The first and second sub-arrays of light emitters 502 may correspond to first and second sub-arrays of light detectors 504, respectively. The first and second sub-arrays of light detectors 504 may also be independently powered from one another, as well. Based on the difference in firing times between the first sub-array of light emitters 502 and the second sub-array of light emitters 502, the signal detections using the first sub-array of light detectors 504 and the second sub-array of light detectors 504 may also be staggered in time. Having multiple sub-arrays of light emitters 502 and light detectors 504 (especially sub-arrays that are independently powered) may also provide redundancy for detecting objects in the surrounding environment.

As described above, the control circuit 508 may include a controller (e.g., a microprocessor configured to execute instructions stored on a non-transitory, computer-readable medium). Additionally or alternatively, the control circuit 508 may communicate with an external controller. Regardless if a controller is internal or external to the control circuit 508, the controller may selectively fire the light emitters 502 using a firing circuit via firing-control signals (e.g., according to a firing sequence). Additionally, the controller may receive electric signals from the light detectors 504 corresponding to detection events within the light detectors 504. Further, the controller may use such electric signals to determine information about objects in an environment surrounding the lidar device 500. For example, the controller may determine the range to one or more objects in the surrounding environment and/or the reflectivities of one or more objects in the surrounding environment based on the electric signals. As illustrated, the conductive traces 506 may be connected to multiple light detectors 504. As such, electric signals from each of the light detectors 504 may include identifying information (e.g., a header code) to identify from which light detector 504 the electric signal originated. Additionally or alternatively, the light detectors 504 may be configured to send electric signals along the same conductive trace 506 according to a certain timing scheme so that electric signals can be matched up by a controller with the light detector 504 from which the signal originated. In alternate embodiments, each conductive trace 506 may only be connected to a single light detector 504 (e.g., a single conductive trace may run between a controller and a single light detector 504). In such embodiments, multiplexing of electric signals may not be used.

In some embodiments, the controller may also be configured to control other functions of the lidar device 500. For example, the controller may control the movement of one or more actuators associated with the lidar device 500 and/or generate a point-cloud representation of the environment surrounding the lidar device 500 based on received electronic signals from light detectors 504 in the lidar device 500 that correspond to detected light signals reflected from objects in the environment. Generating the point-cloud representation may be done based on the intensity of the detected signal compared to the intensity of an emitted signal and/or based on the timing of the detected signal compared to the timing of an emitted signal, in various embodiments. In alternate embodiments, data about detected light signals and/or emitted light signals (e.g., timing data or intensity data) may be transmitted to a separate computing device (e.g., a remotely located server computing device or an on-board vehicle controller). The separate computing device may be configured to generate the point-cloud representation (e.g., and store the point-cloud representation in a memory and/or transmit the point-cloud representation to a lidar controller).

Figure 6A:
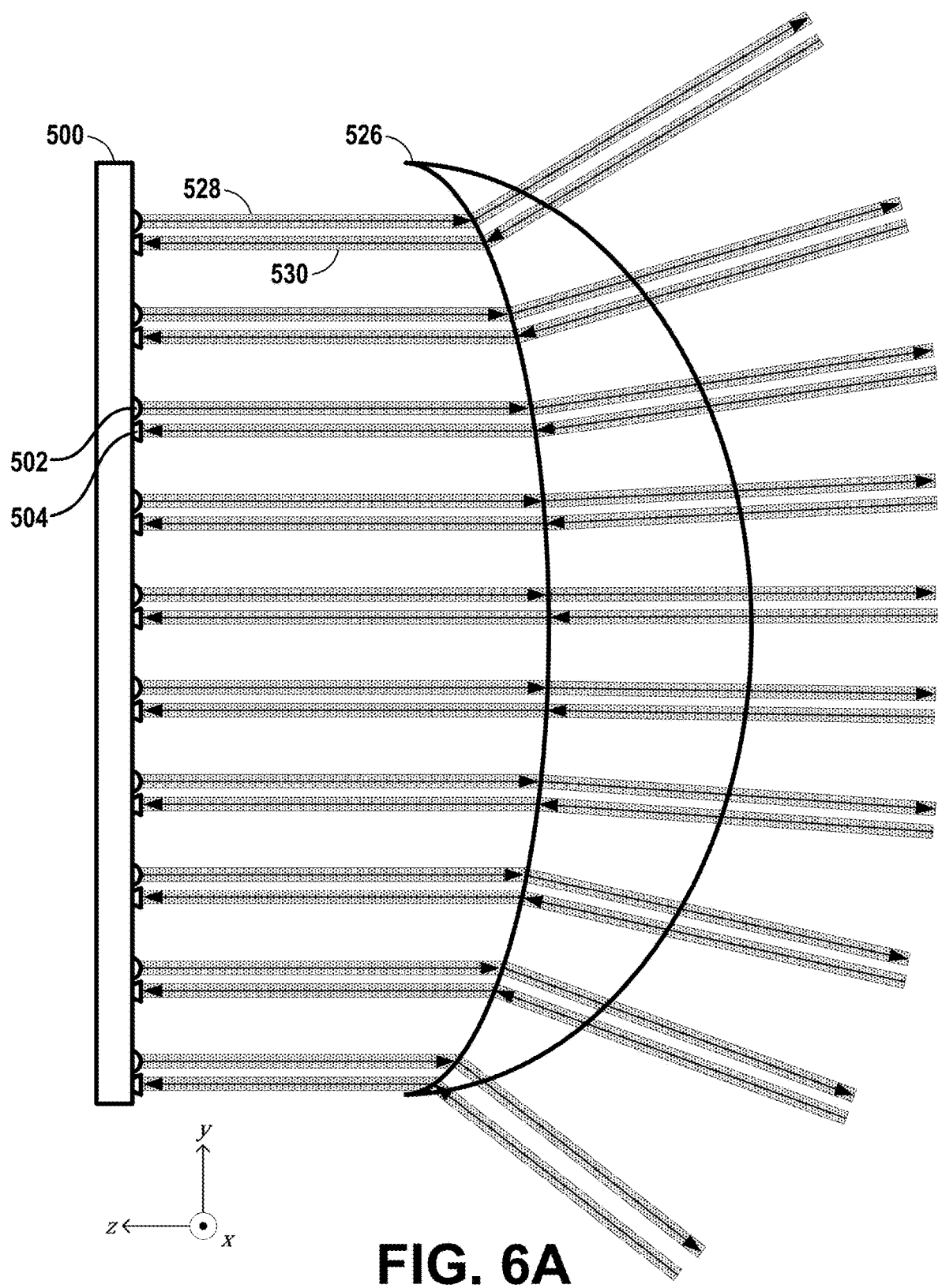
FIG. 6A is a side-view illustration of a lidar device, according to example embodiments.

FIG. 6A is a side-view illustration of a lidar device (e.g., the lidar device 500 illustrated in FIG. 5). The lidar device 500 may be performing a firing cycle (e.g., as part of a firing sequence). The firing cycle may include emitting one or more transmit light signals 528 from one or more of the light emitters 502 and receiving one or more reflected light signals 530 at one or more of the light detectors 530. In some embodiments, the transmit light signals 528 and the reflected light signals 530 may have wavelengths of about 905 nm, about 940 nm, and/or about 1550 nm. Further, the system illustrated in FIG. 6A may also include a shared lens 526.

The shared lens 526 may distribute the transmit light signals 528 across a range of elevation angles (as illustrated) and/or a range of azimuthal angles. Based on time delays between the transmit light signals 529 and the reflected light signals 530, distances to one or more objects in a surrounding environment may be determined. In some embodiments, a point cloud (e.g., a three-dimensional point cloud) may be generated based on such distances. Further, by comparing intensities of the transmit light signals 528 to intensities of the corresponding reflected light signals 530, reflectivities of one or more objects in a surrounding environment may be determined.

FIG. 6A may not represent a snapshot in time. For example, depending on distances to objects in the surrounding environment, the reflected light signals 530 may arrive at the light detectors 504 with a time delay with respect to when the transmit light signals 528 are emitted by the light emitters 502. For instance, if an object in the surrounding environment is reflecting the transmit light signals 528 and is 100.0 m away from the lidar device 500, the reflected light signals 530 may reach the light detectors 504 about 333.3 ns after the transmit light signals 528 were emitted by the corresponding light emitters 502. It is also understood that, in some cases, each transmit light signal 528 may not have a corresponding reflected light signal 530 (e.g., if the transmit light signal 528 did not interact with an object in the surrounding environment, such as when a transmit light signal 528 is shot up into the sky, or interacted with an object in the surrounding environment having sufficiently low reflectivity so as not to provide a detectable reflection).

Figure 6B:
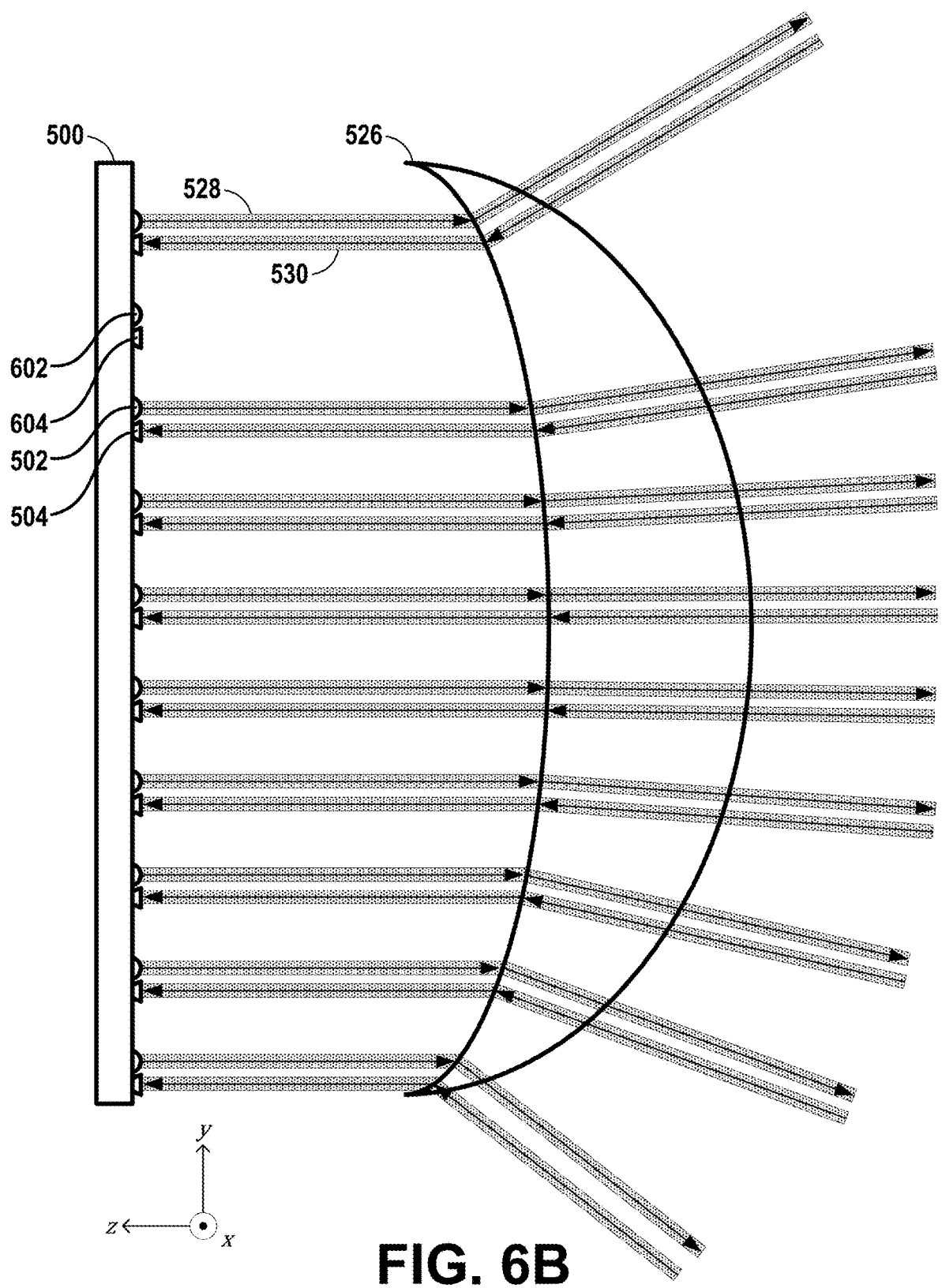
FIG. 6B is a side-view illustration of a lidar device, according to example embodiments.
Figure 6C:
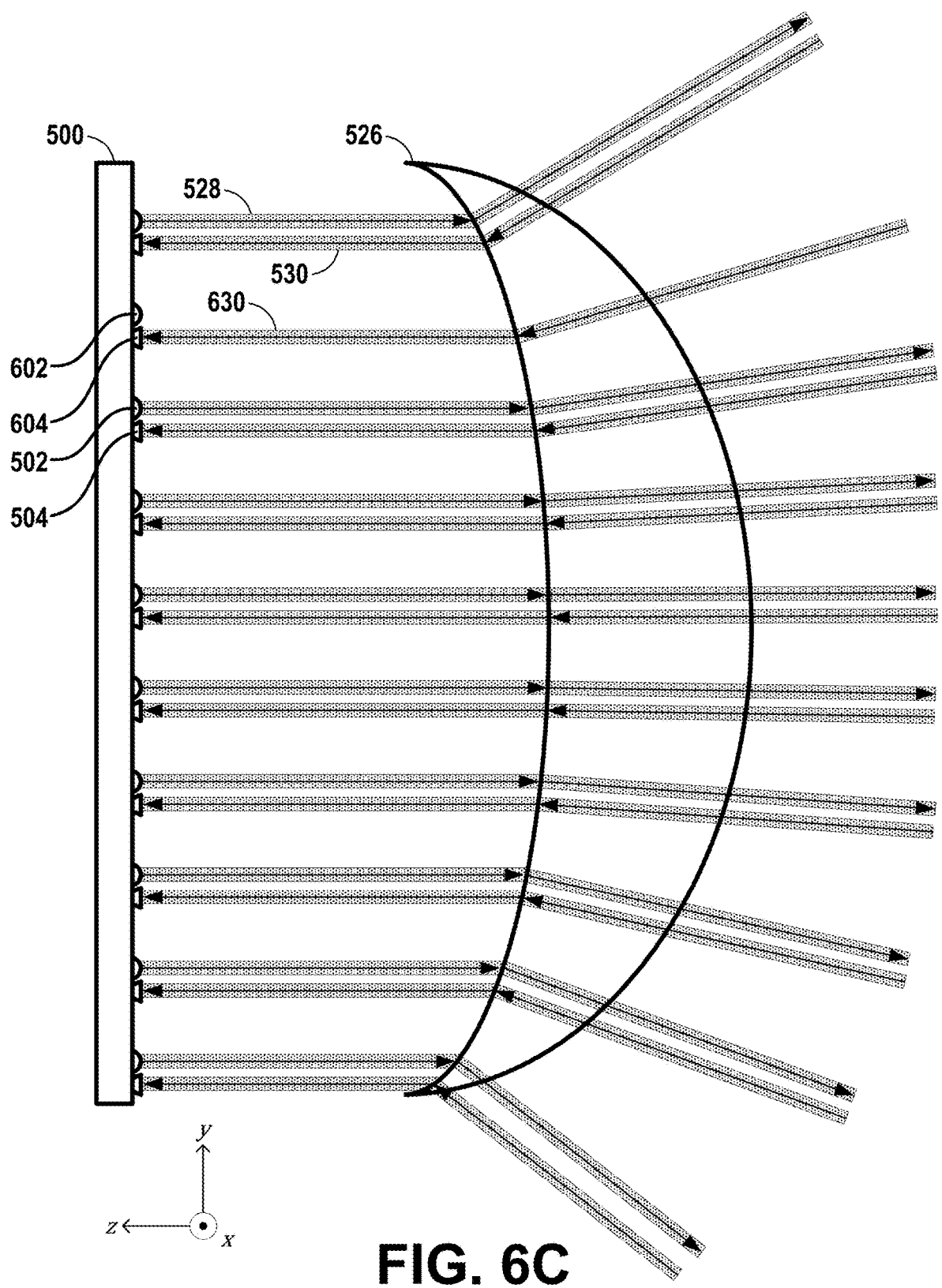
FIG. 6C is a side-view illustration of a lidar device, according to example embodiments.

FIGS. 6B and 6C are side-view illustrations of lidar devices (e.g., the lidar device 500 illustrated in FIG. 5). The lidar device 500 may be performing a firing cycle (e.g., as part of a firing sequence). Similar to FIG. 6A, the firing cycle may include emitting one or more transmit light signals 528 from one or more of the light emitters 502 and receiving one or more reflected light signals 530 at one or more of the light detectors 530. Unlike FIG. 6A, however, during the firing cycle of FIGS. 6B and 6C, a light emitter has been selectively deactivated (e.g., the selectively deactivated light emitter 602 does not emit a transmit light signal 528).

The selectively deactivated light emitter 602 may be deactivated during a firing cycle (e.g., a firing cycle in which the selectively deactivated light emitter 602 would otherwise be emitting a light signal) in order to detect interference. Those light emitters 502 (and corresponding light detectors 504) that have not been selectively deactivated, however, may still be used for object detection (e.g., distance determination) during the firing cycle.

Interference may represent one or more light signals transmitted from one or more light emitters external to the lidar device 500 (e.g., light emitters in a surrounding environment) that influence measurements made by the lidar device 500. As used herein, the term "interference" is distinct from the term "noise." "Noise" may represent things like broadband background light (e.g., sunlight) that set an intensity noise floor above which light signals for the lidar device 500 are emitted/detected in order to register as a usable data point. The terms "interference," "interference signals," and "interference light signals," however, may describe relatively narrowband light signals (e.g., having a 1 nm bandwidth, a 2 nm bandwidth, a 3 nm bandwidth, a 4 nm bandwidth, a 5 nm bandwidth, a 6 nm bandwidth, a 7 nm bandwidth, a 8 nm bandwidth, a 9 nm bandwidth, 10 nm bandwidth, etc. and/or a bandwidth that is roughly the same as the bandwidth of the light emitters 502 of the lidar device 500). Further, in some cases "interference," "interference signals," and "interference light signals" may be emitted by other light emitters for the purpose of being detected by one or more light detectors of a lidar device. For example, some "interference signals" may be emitted by light emitters of other lidar devices (e.g., lidar devices in fleets different from the fleet of the lidar device 500 or other lidar devices in the same fleet as the lidar device 500) in order for those other lidar devices to perform distance measurements. Alternatively, "interference signals" may be emitted from a malicious light source for the purpose of interfering with the detection of the light detectors 504 of the lidar device 500 when such "interference signals" are detected by the lidar device 500 (in addition to or instead of an anticipated reflected light signals 530).

FIG. 6D illustrates an embodiment where interference influencing measurements by the lidar device 500 may originate from another lidar device on another vehicle 650. In various embodiments, the additional lidar device may be in the same fleet as the lidar device 500 or in a different fleet from the lidar device 500. FIG. 6E, on the other hand, illustrates an embodiment where interference influencing measurements by the lidar device 500 may originate from a malicious source (e.g., an antagonist who wishes to negatively influence measurements made by the lidar device 500 by illuminating the lidar device 500 with spurious light signals).

In some embodiments, the selectively deactivated light emitter 602 may be deactivated based on an identification (e.g., by a controller onboard the lidar device 500, a controller onboard a vehicle associated with the lidar device 500, a fleet management server, or another computing device) that an interference detection process should be executed. For example, the lidar device 500 may be one of a plurality of lidar devices within a fleet of lidar devices, and identifying that the interference detection process should be executed includes determining that the lidar device 500 is within a threshold distance of another lidar device within the fleet of lidar devices. The threshold distance may be a distance relative to another lidar device, less than which the lidar device 500 may inadvertently detect light signals emitted from the other lidar device. Additionally or alternatively, identifying that the interference detection process should be executed may include receiving an instruction to execute the interference detection process (e.g., from another lidar device, from another sensor on a vehicle associated with the lidar device 500, from another vehicle in the same fleet as a vehicle corresponding to the lidar device 500, from a fleet management server, etc.). In still other embodiments, identifying that the interference detection process should be executed may include determining that one or more recent measurements made by the lidar device 500 is inaccurate by at least a threshold amount.

While only one of the light emitters is selectively deactivated in FIGS. 6B and 6C, it is understood that this is provided solely as an example and that other numbers of light emitters 502 may alternatively be selectively deactivated for the purpose of interference detection (e.g., as shown and described below with reference to FIGS. 7A and 7B).

As illustrated in FIG. 6B, no reflected light signal is received by the light detector 604 corresponding to the selectively deactivated light emitter 602. This may indicate that no interference is incident on the light detector 604. In some embodiments, it may thus be determined (e.g., in conjunction with other interference measurements) that no interference is influencing measurements made by the lidar device 500. As such, the measurements made by the lidar device 500 may be determined to be reliable (e.g., for objecting detection and avoidance within an associated autonomous vehicle).

In other cases (e.g., as illustrated in FIG. 6C), though, the corresponding light detector 604 may detect an incoming light signal (i.e., an interference signal 630). Because a light signal is detected at a light detector 604 corresponding to a selectively deactivated light emitter 602, it may be determined that the interference signal 630 was not transmitted by the lidar device 500. As described above, the interference signal 630 may correspond to incidental/inadvertent interference and/or malicious interference. Hence, by selectively deactivating one or more light emitters and then identifying whether or not an interference signal is detected on corresponding light detectors, it can be identified whether interference has been, currently is, and/or may potentially in the future be influencing measurements made by the lidar device 500.

As described above, one or more light emitters 602 within the lidar device 500 may be selectively deactivated during a firing cycle to identify whether interference is influencing measurements made by the lidar device 500. Additionally or alternatively, though, it is understood that other changes could be made to the emissions of one or more of the light emitters 602 to identify interference. For example, rather than deactivating one or more of the light emitters 602, at least one of the light emitters 602 may have a reduced emission power. Then, if a corresponding light detector 604 detects a signal with the default emission power, as opposed to the reduced emission power, interference is still detectable. However, if the corresponding light detector 604 detects a light signal with the reduced emission power, though, it may be determined that interference is not present and that the detected light signal may be used (e.g., for object detection and avoidance based on a point cloud generated using the detected light signal). In still other embodiments, other modifications may be made to emitted light signals. For example, a polarization of the emitted signal may be modified and polarization of a detected signal may be compared to the modified polarization to identify interference (e.g., if the polarizations do not match, interference may be present). In still other embodiments, a pulse shape of the emitted signal may be modified (e.g., from a sinusoidal shape to a square shape or a triangular shape) and compared with a pulse shape of the detected signal to identify interference.

Regardless of the method used to identify interference, if it is identified that interference has been, currently is, or may potentially in the future be influencing measurements made by the lidar device, the lidar device 500 and/or an associated device may perform an action, transmit a communication, and/or set a flag based on the identified interference. For example, the lidar device 500 or an associated vehicle (e.g., the vehicle 200 illustrated in FIGS. 2A-3) may be placed into a degraded-state mode when interference is identified as influencing measurements made by the lidar device 500. Placing the lidar device 500 in a degraded-state mode may include deactivating one or more light emitters 502 and/or one or more corresponding light detectors 504, disregarding measurements made by one or more light emitter 502/light detector 504 combinations that are experiencing interference, modifying measurements (e.g., by adjusting measured intensity or distance in post-processing) made by one or more light emitter 502/light detector 504 combinations, powering down the entire lidar device 500, decommissioning the lidar device 500, etc. Additionally, placing an associated vehicle 200 into a degraded-state mode may include slowing the vehicle's velocity, putting the vehicle 200 in park, relying more heavily on one or more other sensors on the vehicle 200 (e.g., sensors that are auxiliary to the lidar device 500), decommissioning the vehicle 200, altering a route of the vehicle 200 to avoid more hazardous areas, etc. Even further, the lidar device 500 and/or the associated vehicle 200 may transmit a communication to another lidar device, another vehicle in a fleet of vehicles, and/or a fleet management server (e.g., the server computing system 306 illustrated and described with reference to FIG. 3). The communication may indicate that the lidar device 500 and/or the vehicle 200 is being placed into a degraded-state mode, may indicate what kind of degraded-state mode the lidar device 500 and/or the vehicle 200 is being placed into, may indicate the presence and/or direction of the origin of the interference, may request assistance regarding the decision of whether to be placed in a degraded-state mode, may request that other lidar devices/vehicles in the fleet steer clear of the area of the lidar device 500/vehicle 200 to reduce future interference, may indicate that the lidar device 500 and/or the vehicle 200 is out of commission for an indicated time duration, etc.

In some embodiments (e.g., embodiments where multiple light emitters 502 are deactivated for the purpose of interference detection), a map of interference across the light emitters 502/light detectors 504 can be made based on detected interference signals. For example, the regions of the lidar device 500 that coincide with light detectors 604 corresponding to selectively deactivated light emitters 602 that detect interference signals 630 may be identified as experiencing interference. A map of all those regions experiencing interference may be generated based on the results of one or more interference detection procedures. Such a map may be stored within a memory (e.g., a memory of the lidar device 500, a vehicle associated with the lidar device 500, and/or a memory of a fleet management server, such as the server computing system 306 illustrated and described with reference to FIG. 3) and/or used to analyze/compensate for measurements made by the lidar device 500. Further, in some embodiments, a map of interference may include interpolation(s) and/or extrapolation(s) for regions within the lidar device 500 that correspond to light emitters 502 that were not selectively deactivated during one or more interference detection procedures, but are between light emitter 602/light detector 604 combinations that were selectively deactivated during one or more interference detection procedures or nearby one or more light emitter 602/light detector 604 combinations that were selectively deactivated during one or more interference detection procedures.

In some embodiments, the emission bandwidth of the light emitters 502 of the lidar device 500 may be relatively narrow (e.g., 1.0 nm, 2.0 nm, 3.0 nm, 4.0 nm, 5.0 nm, 6.0 nm, 7.0 nm, 8.0 nm, 9.0 nm, 10.0 nm, etc. in bandwidth). As such, the light detectors 504 may have a correspondingly narrow detection band (e.g., designed based on the physics of the light detectors 504 themselves or by applying one or more optical filters within the lidar device 500 to eliminate wavelengths outside of the emission bandwidth). This may reduce and/or eliminate any noise from the surrounding environment that could potentially impact measurements by the lidar device 500 (e.g., may reduce or eliminate noise arising from sunlight; traffic signals; lights from other vehicles, such as headlights, taillights, brake lights, or emergency lights; streetlights; illuminated billboards, etc.). Hence, it may be unlikely that any light signal detected by the corresponding light detector 604 represents noise (as opposed to interference). However, in some embodiments, one or more techniques may be used to disambiguate noise signals from interference signals (e.g., light signals emitted by the lidar device 500 may be pulsed at a given frequency or using a modulation scheme such that light signals received that do not have the given frequency/modulation scheme may be classified either as a detected signal or interference signal, as opposed to noise).

Further, in some embodiments, the lidar device 500 may disambiguate the type of interference (if any) that is influencing measurements made by the lidar device 500. For example, the lidar device 500 (or an associated computing device or fleet management server, such as the server computing system 306 illustrated and described with reference to FIG. 3), may be able to determine (e.g., based on the detected interference signal 630) whether inadvertent interference or malicious interference is influencing measurements by the lidar device 500. Even further, in cases where inadvertent interference is occurring, the lidar device 500 (or an associated computing device or fleet management server, such as the server computing system 306 illustrated and described with reference to FIG. 3) may be able to determine whether the inadvertent interference is coming from one or more lidar devices within the same fleet as the lidar device 500 or from devices outside of the fleet of the lidar device 500 (e.g., lidar devices that are produced by a different manufacturer or are involved with a different autonomous vehicle service). Determining whether inadvertent interference or malicious interference is occurring and, more particularly, whether inadvertent interference is coming from the same fleet or a different fleet may involve comparing a modulation scheme used by the lidar device 500 to a modulation scheme, or lack thereof, associated with the interference signal 630. If the modulation scheme of the interference signal 630 matches that of the lidar device 500, then the interference may be inadvertent interference from another lidar device in the same fleet as the lidar device 500. If the interference signal 630 is associated with a different modulation scheme than the modulation scheme of the lidar device 500, it may be determined that the interference is inadvertent interference from a lidar device in a different fleet of lidar devices. Further, if no modulation scheme is used to generate the interference signal 630, then it may be determined that the interference is malicious interference. Other methods of disambiguating among types of interference are also possible and are contemplated herein.

As described above, one or more light emitters may be deactivated during a firing cycle to identify interference influencing measurements of a lidar device. FIG. 7A is a front-view illustration of a lidar device (e.g., the lidar device 500 illustrated in FIGS. 6A-6C) with multiple of the light emitters 602 being selectively deactivated (e.g., similar to the selectively deactivated light emitter 602 illustrated in FIG. 6C). As with FIG. 6C, the selectively deactivated light emitters 602 of FIG. 7A may be selectively deactivated during a firing cycle in order to identify whether interference signals are present. The selectively deactivated light emitters 602 may be pseudo-randomly selected for deactivation during a firing cycle, in some embodiments. For example, the selectively deactivated light emitters 602 may be pseudo-randomly selected for deactivation during a firing cycle by generating a pseudo-random sequence using a linear shift register, a feedback shift register, or a cryptographic circuit. Further, such a linear shift register, feedback shift register, or cryptographic circuit may generate the pseudo-random sequence using a seed. The seed may be provided by a computing system used to control a vehicle associated with the lidar device 500 (e.g., the computer system 112 illustrated and described with reference to FIG. 1), by a controller of the lidar device 500, and/or by a fleet management server (e.g., the server computing system 306 illustrated and described with reference to FIG. 3).

Figure 7A:
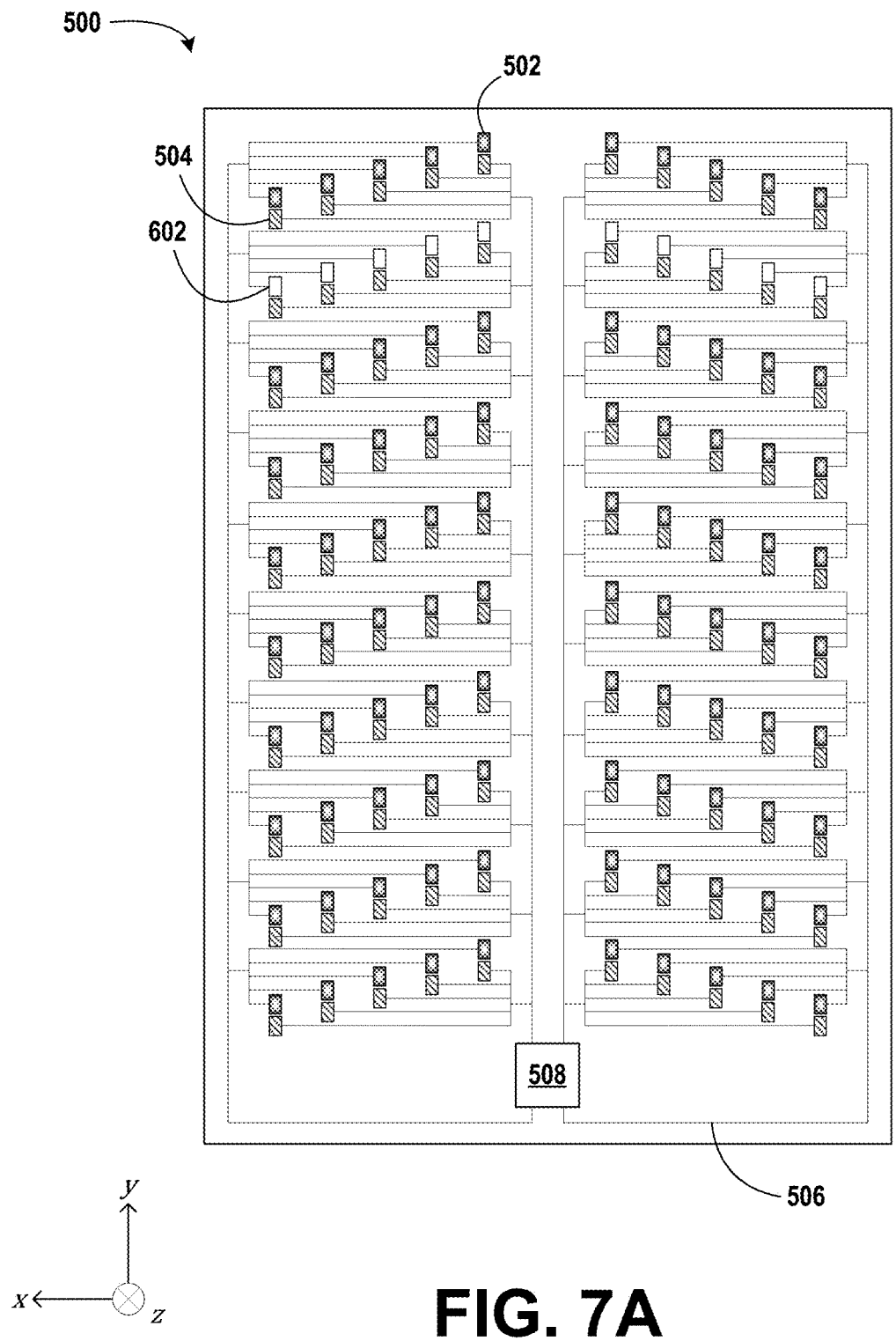
FIG. 7A is a front-view illustration of a lidar device, according to example embodiments.
Figure 7B:
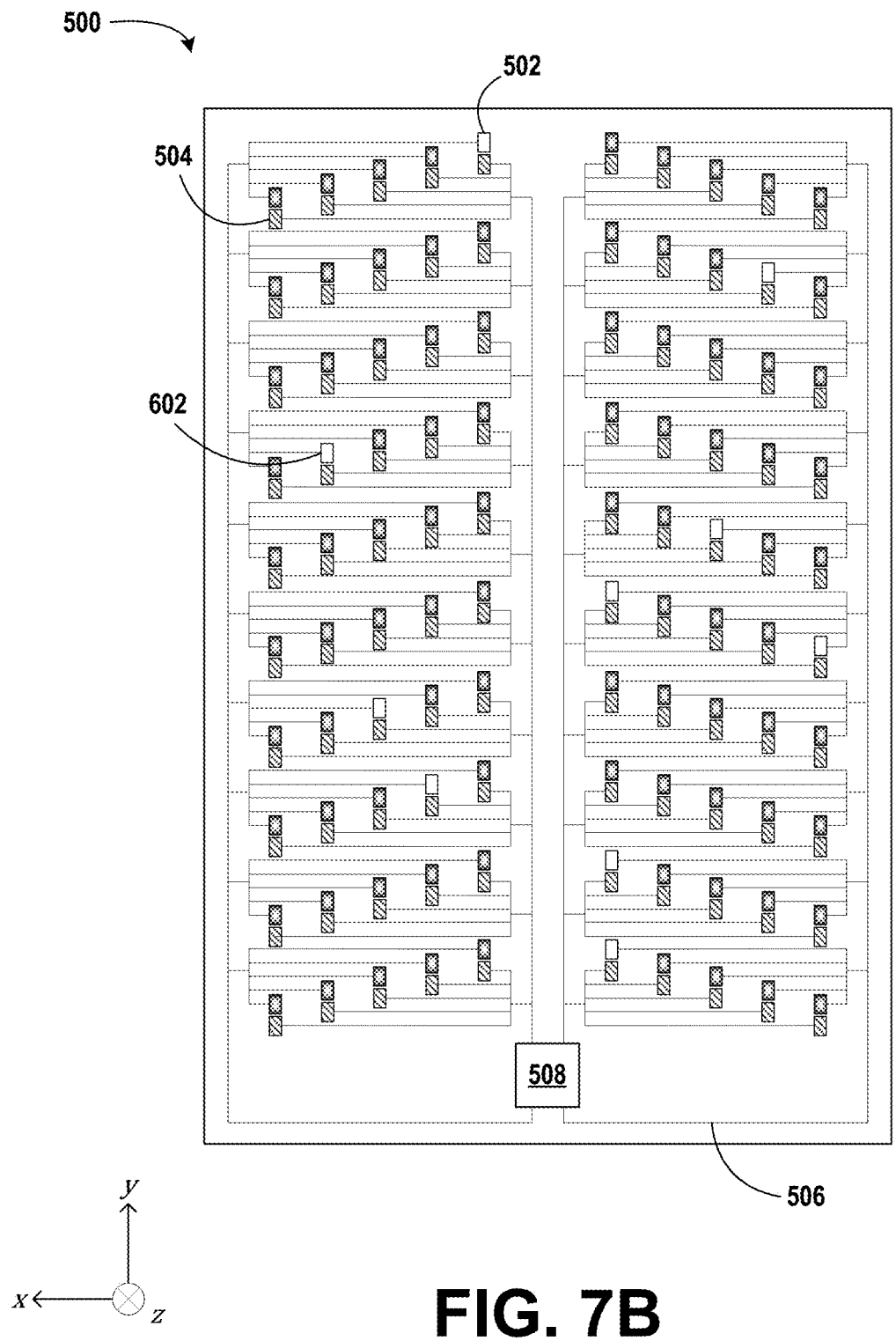
FIG. 7B is a front-view illustration of a lidar device, according to example embodiments.

Further, as illustrated in FIG. 7A, the light emitters that are selectively deactivated within the lidar device 500 during the firing cycle to identify interference may be contiguously positioned across the array of light emitters of the lidar device 500. In other words, each of the selectively deactivated light emitters 602 may be adjacent to another selectively deactivated light emitter 602 with no light emitters that are not selectively deactivated located therebetween. In other embodiments, however, this need not be the case. For example, FIG. 7B is a front-view illustration of an embodiment where the selectively deactivated light emitters 602 are not all located contiguously.

In some embodiments, about 10% of the total number of light emitters 502 within the lidar device 500 may be deactivated during the firing cycle in order to identify interference influencing measurements by the lidar device 500. This is illustrated in FIGS. 7A and 7B (10 of the 100 light emitters 502 have been selectively deactivated). It is understood that this number of selectively deactivated light emitters 602 is provided solely as an example and that other percentages of selectively deactivated light emitters 602 are also possible and contemplated herein. For example, about 1%, about 5%, about 15%, about 20%, about 25%, about 30%, about 35%, about 40%, about 45%, about 50%, etc. of the light detectors 502 could alternatively be selectively deactivated for the purpose of identifying interference. About 10% selective deactivation, however, may strike an appropriate balance between having enough light emitters 602 selectively deactivated during the firing cycle to be able to properly identify whether interference is present while still leaving enough light emitters 502 activated during the firing cycle to perform adequate measurements using the lidar device 500 (e.g., about 90% of the light emitters 502).

Figure 8A:
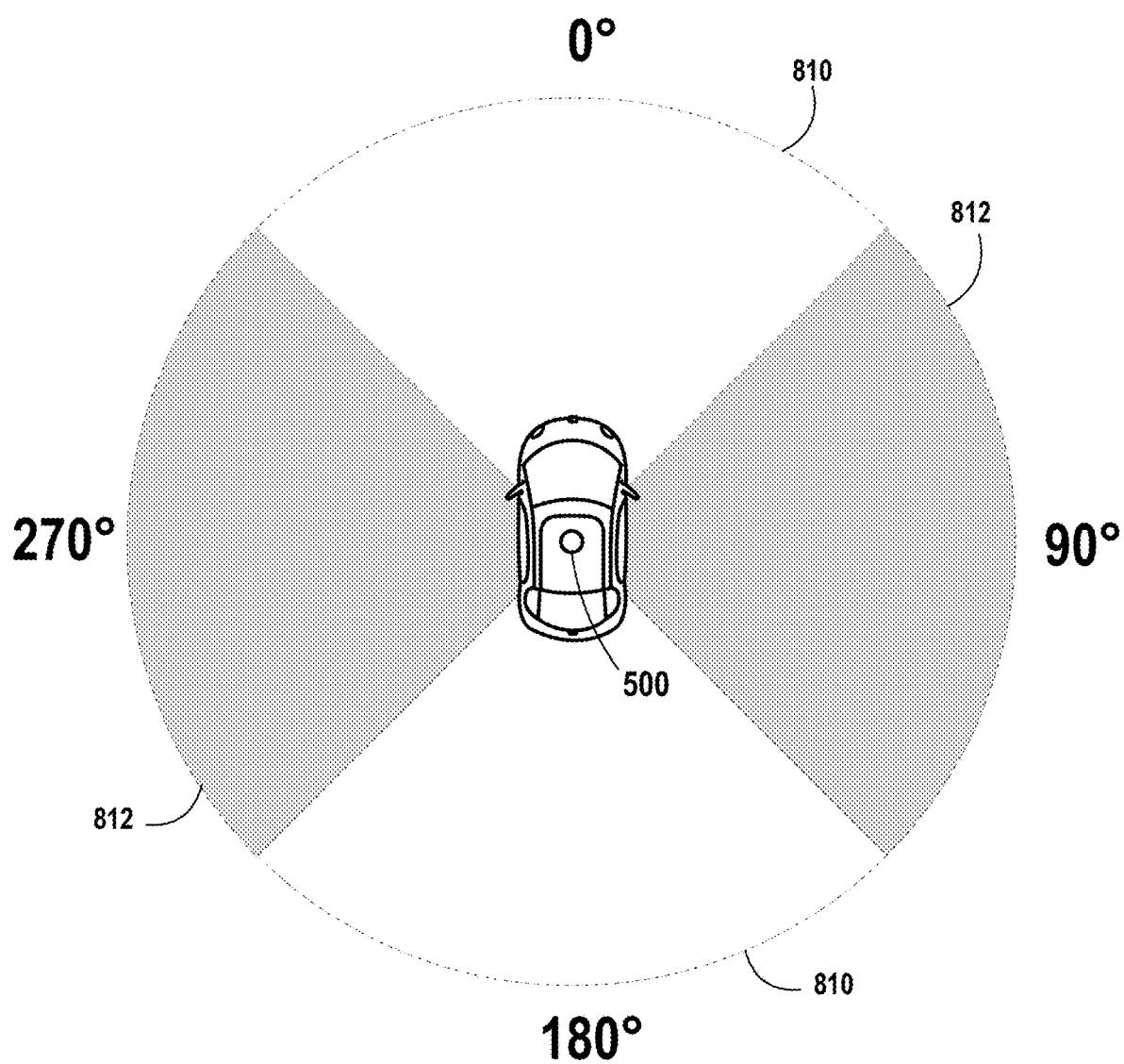
FIG. 8A is an illustration of regions of disinterest near a lidar device, according to example embodiments.

As described above, one or more light emitters may be deactivated during a firing cycle to identify interference influencing measurements by a lidar device. In some embodiments, which of the light emitters are selectively deactivated and/or for which firing cycles those light emitters are deactivated within a firing sequence may be determined based on one or more regions of disinterest in an environment surrounding the lidar device 500. An example embodiment of this is illustrated in FIG. 8A. As illustrated, one or more regions of disinterest 812 may be in the environment surrounding the lidar device 500. As shown in FIG. 8A, the regions of disinterest 812 may correspond to certain azimuthal regions around a vehicle that corresponds to the lidar device 500. Those azimuthal regions that do not represent the regions of disinterest 812 are labeled as regions of interest 810 in FIG. 8A. The one or more regions of disinterest 812, as illustrated in FIG. 8A, may correspond to regions to the right (e.g., "passenger side") and left (e.g., "drivers side") of the vehicle that corresponds to the lidar device 500. Similarly, the regions of interest 810 may correspond to regions in front of (e.g., in the direction of travel) and behind (e.g., opposite the direction of travel) the vehicle that corresponds to the lidar device 500.

The one or more regions of disinterest 812 in the environment surrounding the lidar device 500 may be identified in a variety of ways. In some embodiments, the one or more regions of disinterest 812 may be determined based on previous measurements. For example, the regions of disinterest 812 may be determined based on a point cloud previously generated based on measurements by the lidar device 500 or another lidar device. Additionally or alternatively, the one or more regions of disinterest 812 may be determined based on measurements from one or more auxiliary sensors of a vehicle corresponding to the lidar device 500 (e.g., a camera and/or a radar unit) or one or more auxiliary sensors of another vehicle in the same fleet as the lidar device 500 (e.g., cameras and/or radar units attached to other vehicles in the fleet).

Further, the one or more regions of disinterest 812 may be determined based on specific regions of the environment surrounding the lidar device 500 that include objects that require less attention (e.g., do not require identification) than other objects in the surrounding environment. For example, objects that are farther away from the lidar device 500 may require less attention than nearer objects. In some embodiments, there may be a threshold distance that, if objects in a given region of the surrounding environment are beyond the threshold distance from the lidar device 500, the region of the surrounding environment may be identified as a region of disinterest 812. In other embodiments, regions of disinterest 812 may be identified if those regions contain certain types of objects. For example, if certain regions contain disinteresting objects (e.g., stationary objects that have previously been localized and identified or other vehicles in the same fleet whose position has been determined by methods other than lidar detection, such as communication with the other vehicles or communication with a fleet management server) or no objects at all (e.g., a region that corresponds to the sky surrounding the lidar device 500), those regions may be determined to be regions of disinterest 812.

In some embodiments, control systems of a vehicle corresponding to the lidar device 500 may indicate the location of one or more regions of disinterest 812 and/or one or more regions of interest 810. In some embodiments, such regions of disinterest 812 and/or regions of interest 810 may be based on a direction of travel of the vehicle corresponding to the lidar device 500. For example, if the vehicle is turning left or changing lanes, the regions of disinterest 812 and/or regions of interest 810 may be adjusted to accommodate such a maneuver (e.g., additional regions of disinterest 812 may be allocated to portions of the scanning range of the lidar device 500 corresponding to the left side of the vehicle). Similarly, when a vehicle is driving in reverse instead of forward, the number of and/or angular range of regions of disinterest 812 and/or regions of interest 810 may change. Further, in some embodiments, one or more of the regions of disinterest 812 and/or one of the regions of interest 810 may be identified based on terrain near a vehicle associated with the lidar device 500 (e.g., if the vehicle is travelling uphill, regions of higher elevation may be of greater interest than regions of lower elevation, and vice versa if a vehicle is travelling downhill). Even further, regions of interest 810 and regions of disinterest 812 may be chosen based on the locations of the road surface, road horizon, overhead signs, signals, overpasses, vehicles, pedestrians, animals, etc.

In addition, regions of disinterest 812 and/or regions of interest 810 may be communicated to the lidar device 500 or a vehicle corresponding to the lidar device 500 from another vehicle (e.g., another vehicle within the same fleet), another lidar device, or a computing device (e.g., a fleet management server configured to communicate with the lidar device 500 or a vehicle associated with the lidar device 500). It is understood that the regions of disinterest may be identified in a variety of ways in addition to or instead of the methods described above. Such alternative or additional methods of identifying regions of disinterest are contemplated herein.

For illustrative purposes, FIG. 8A depicts two regions of disinterest 812. When the lidar device 500 is azimuthally oriented (e.g., by one or more actuators of the lidar device 500) such that light signals will be emitted toward the regions of disinterest 812, one or more of the light emitters 502 may be selectively deactivated and the corresponding light detector(s) 504 may be used for interference detection. It is understood that there may be greater or fewer than the two regions of disinterest 812 illustrated in FIG. 8A, the regions of disinterest 812 could be located at different azimuthal angles than illustrated in FIG. 8A, and/or the angular range spanned by the regions of disinterest 812 may be different than those illustrated in FIG. 8A. It is also understood that the lidar device 500 need not include an actuator to have different light emitters 502 oriented toward different azimuthal angles. For example, different light emitters 502 within the lidar device 500 may be in different locations relative to one or more mirrors and/or one or more lenses of the lidar device 500 and may, therefore, emit light signals toward different azimuthal angles within a surrounding environment.

FIG. 8B shows the firing sequence of one or more of the light emitters 502 of the lidar device 500 based on the regions of disinterest 812 in FIG. 8A (in particular, the light emitter(s) 502 selectively deactivated for one or firing cycles when oriented toward the regions of disinterest 812 to perform interference detection). When oriented toward regions of interest 810 (e.g., regions other than regions of disinterest 812), the light emitter(s) 502 may emit light signals at a given intensity level (e.g., according to the firing sequence) in order to perform measurements of the surrounding environment. However, when oriented toward regions of disinterest 812, one or more of the light emitter(s) 502 may selectively refrain from emitting any light signals such that interference detection can be performed as described herein. As illustrated in FIGS. 8A and 8B, the regions of disinterest 812 may correspond to azimuthal angles of about 45° to about 135° and about 225° to about 315°. Correspondingly, the regions of interest 810 may correspond to azimuthal angles of about 0° to about 45°, about 135° to about 225°, and about 315° to about 360°. It is understood that the number of regions of disinterest 812 and regions of interest 810 and the angular span of each of the regions of disinterest 812 and regions of interest 810 are provided solely as an example and that other numbers and/or angular spans are also possible and contemplated herein.

Figure 9A:
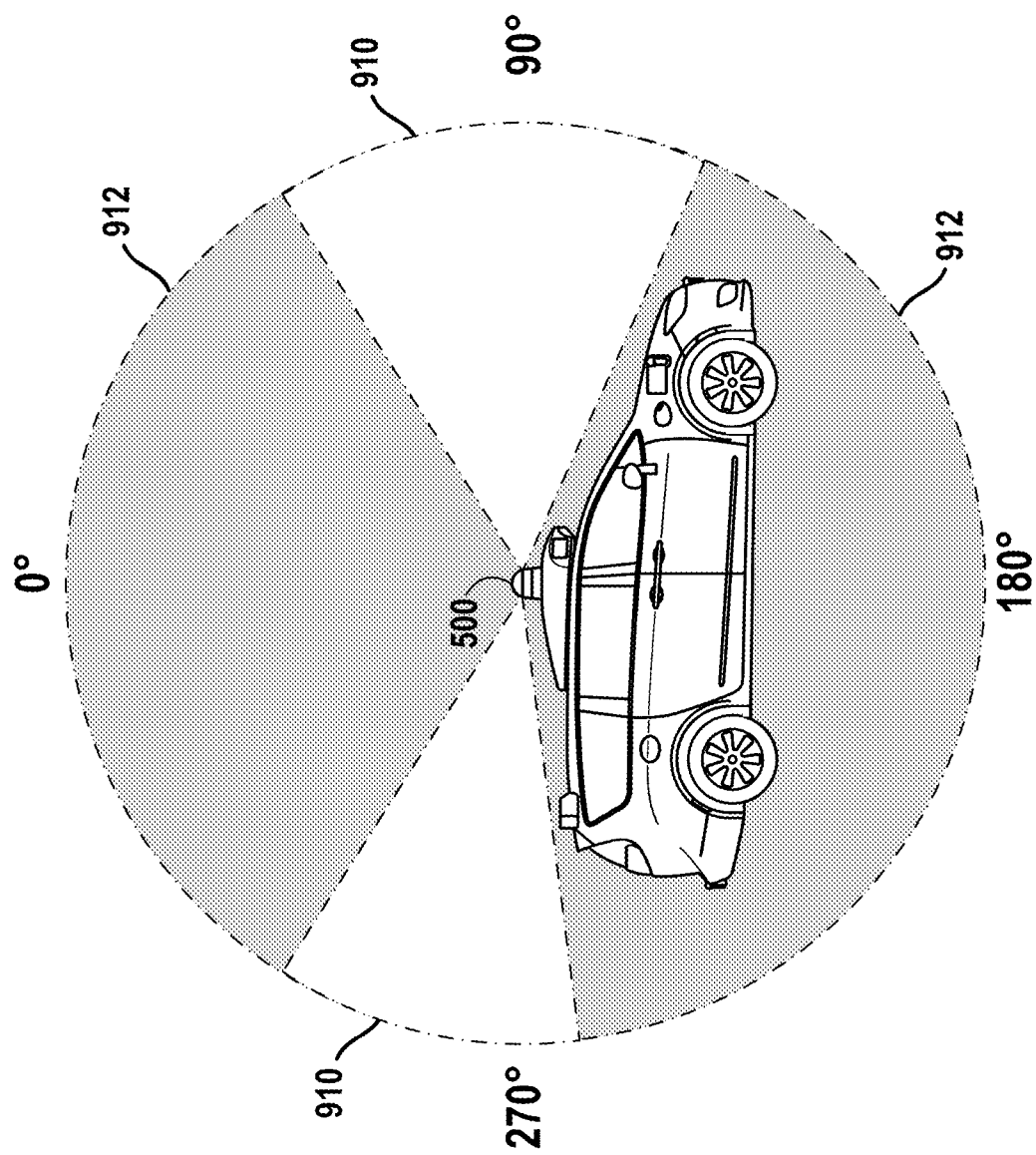
FIG. 9A is an illustration of regions of disinterest near a lidar device, according to example embodiments.
Figure 9B:
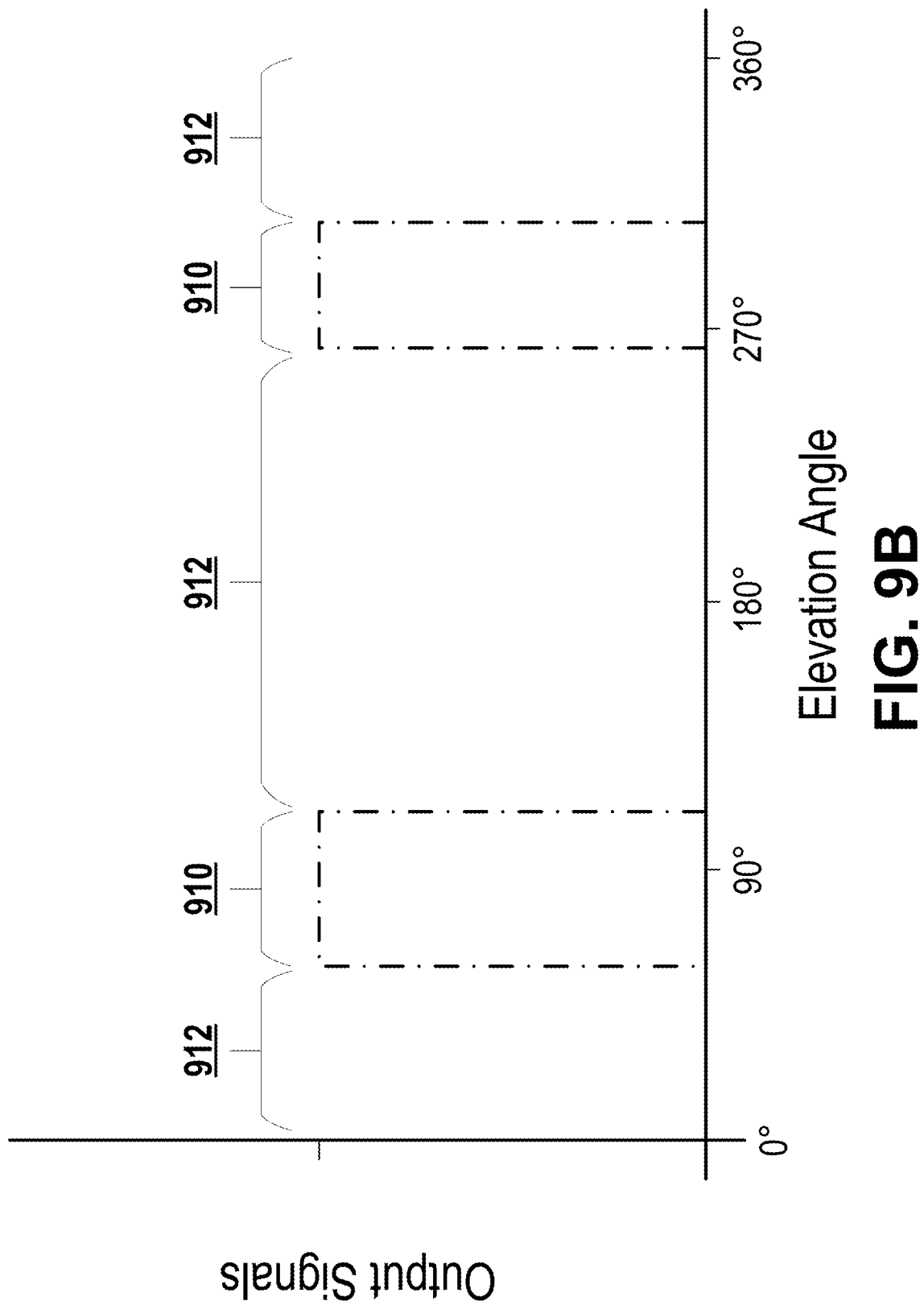
FIG. 9B is a graphical representation of selective deactivation of one or more light emitters in a lidar device based on regions of disinterest.

FIGS. 9A and 9B are similar to FIGS. 8A and 8B, respectively. However, unlike the regions of interest 810 and regions of disinterest 812 in FIGS. 8A and 8B, regions of interest 910 and regions of disinterest 912 are defined elevationally (as opposed to azimuthally) relative to the lidar device 500. Emission toward different elevation angles may be accomplished by the lidar device 500 based on orientations of the light emitters 502 relative to one or more mirrors and/or one or more lenses within the lidar device 500. Additionally or alternatively, an actuator of the lidar device 500 may be configured to rotate the light emitters 502 and light detectors 504 about the elevation axis such that elevation angles are swept out. As indicated in FIG. 9A, some regions relative to a vehicle corresponding to the lidar device 500 may represent regions of interest 910 and some regions may represent regions of disinterest 912. Similar to FIGS. 8A and 8B, the regions of disinterest 912 in FIGS. 9A and 9B may correspond to regions for which one or more light emitters 502 within the lidar device 500 are selectively deactivated during a firing cycle in order to perform interference detection. Also similar to the regions of disinterest 812 in FIGS. 8A and 8B, the regions of disinterest 912 may be determined in a number of ways (e.g., based on terrain, communications from a computing device of a vehicle associated with the lidar device 500, based on communications from other vehicles or lidar devices in the same fleet as the lidar device 500, based on communications from a fleet management server, based on weather conditions, based on direction of travel, based on previous measurements from the lidar device 500, based on previous measurements from other sensors, based on the location of a road surface, based on the location of a road horizon, based on the location of an overhead sign, based on the location of a signal, based on the location of an overpass, based on the location of another vehicle, based on the location of a pedestrian, based on the location of an animal, etc.).

While the regions of disinterest 912 are illustrated in FIGS. 9A and 9B as being from about 0° to about 60°, about 110° to about 265°, and about 300° to about 360°, it is understood that other numbers and/or angular ranges of regions of disinterest 912 and regions of interest 910 are also possible and contemplated herein.

Analogous to FIG. 8B, FIG. 9B is an illustration of a firing sequence of one or more of the light emitters 502 of the lidar device 500 based on the regions of disinterest 912 in FIG. 9A (in particular, the light emitter(s) 502 selectively deactivated within the regions of disinterest 912 to perform interference detection). When oriented toward regions of interest 910 (e.g., regions other than regions of disinterest 912), the light emitter(s) 502 may emit light signals at a given intensity level (e.g., according to the firing sequence). However, when oriented toward regions of disinterest 912, the light emitter(s) 502 may refrain from emitting any light signals such that interference detection can be performed.

III. Example Processes

Figure 10:
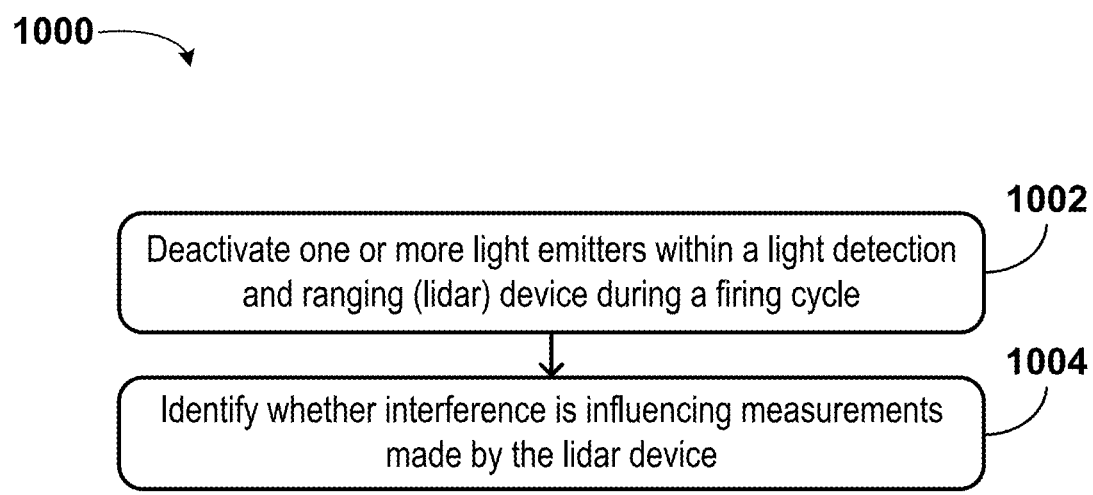
FIG. 10 is a flowchart illustration of a method, according to example embodiments.

FIG. 10 is a flowchart diagram of a method 1000, according to example embodiments. In some embodiments, one or more blocks of FIG. 10 may be performed by a lidar device (e.g., a lidar device used in the autonomous vehicle 100 to perform object detection and avoidance). In some embodiments, the method 1000 may be performed by a controller of a lidar device (e.g., a lidar device that includes an array of light emitters and an array of light detectors, where each of the light detectors is associated with one or more light emitters in the array of light emitters). Alternatively, in some embodiments, a processor executing instructions stored on a non-transitory, computer-readable medium (e.g., a read-only memory (ROM), such as a hard drive or a solid-state memory) may result in the method 1000 being performed. Such a processor and/or non-transitory, computer-readable medium may be a component of a lidar device, a component of a vehicle having a lidar device equipped, or a component of a computing device used to remotely manage a vehicle or a fleet of vehicles, in various embodiments.

At block 1002, the method 1000 may include deactivating one or more light emitters within a light detection and ranging (lidar) device during a firing cycle.

At block 1004, the method 1000 may include identifying whether interference is influencing measurements made by the lidar device. Identifying whether interference is influencing measurements made by the lidar device may include determining, for each light detector of the lidar device that is associated with the one or more light emitters deactivated during the firing cycle, whether a light signal was detected during the firing cycle.

In some embodiments, the method 1000 may also include pseudo-randomly selecting the one or more light emitters within the lidar device to deactivate during the firing cycle.

In some embodiments, pseudo-randomly selecting the one or more light emitters within the lidar device to deactivate during the firing cycle may include generating a pseudo-random sequence using a linear shift register, a feedback shift register, or a cryptographic circuit.

In some embodiments, the linear shift register, the feedback shift register, or the cryptographic circuit may generate the pseudo-random sequence using a seed. The seed may be provided by a computing system used to control a vehicle associated with the lidar device.

In some embodiments, the method 1000 may also include selecting the one or more light emitters within the lidar device to deactivate during the firing cycle based on one or more regions of disinterest.

In some embodiments, at least one of the regions of disinterest may be identified based on terrain near a vehicle associated with the lidar device.

In some embodiments, at least one of the regions of disinterest may be identified based on a direction of travel of a vehicle associated with the lidar device.

In some embodiments, at least one of the regions of disinterest may be identified based on a point cloud previously generated using the lidar device.

In some embodiments, the light emitters that are deactivated during the firing cycle may be contiguously positioned across an array of light emitters within the lidar device.

In some embodiments, the light emitters that are deactivated during the firing cycle may represent about 10% of a total number of light emitters within the lidar device.

In some embodiments, the light emitters that are deactivated during the firing cycle may represent about 50% of a total number of light emitters within the light device.

In some embodiments, the method 1000 may also include placing the lidar device or an associated vehicle into a degraded-state mode when interference is identified as influencing measurements made by the lidar device.

In some embodiments, the lidar device may be one of a plurality of lidar devices within a fleet of lidar devices. Further, identifying whether interference is influencing measurements made by the lidar device may include determining whether another lidar device within the fleet of lidar devices is influencing measurements made by the lidar device.

In some embodiments, identifying whether interference is influencing measurements made by the lidar device may include determining whether a malicious light source is influencing measurements made by the lidar device.

In some embodiments, the method 1000 may also include identifying that an interference detection process should be executed.

In some embodiments, the lidar device may be one of a plurality of lidar devices within a fleet of lidar devices. Further, identifying that the interference detection process should be executed may include determining that the lidar device is within a threshold distance of another lidar device within the fleet of lidar devices.

In some embodiments, identifying that the interference detection process should be executed may include receiving an instruction to execute the interference detection process.

In some embodiments, the light emitters of the lidar device may transmit light signals with wavelengths of about 905 nm, about 940 nm, or about 1550 nm.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   emitting light signals having a first emission characteristic from a first plurality of light emitters within a light detection and ranging (lidar) device during a first firing cycle of a firing sequence;
   listening, during the first firing cycle by each light detector of the lidar device that is associated with the first plurality of light emitters, for light signals reflected from a surrounding environment;
   emitting one or more light signals having a second emission characteristic from one or more light emitters within the first plurality of light emitters during a second firing cycle of the firing sequence, wherein the second emission characteristic differs from the first emission characteristic;
   emitting light signals having the first emission characteristic from a second plurality of light emitters within the lidar device during the second firing cycle, wherein the second plurality of light emitters comprises the light emitters within the first plurality of light emitters that are not emitting light signals having the second emission characteristic during the second firing cycle;
   listening, during the second firing cycle by each light detector of the lidar device that is associated with the first plurality of light emitters, for light signals from the surrounding environment; and
   identifying whether interference is influencing measurements made by the lidar device, wherein identifying whether interference is influencing measurements made by the lidar device comprises determining, for each light detector of the lidar device that is associated with the first plurality of light emitters, whether any light signals detected during the second firing cycle correspond to the first emission characteristic or the second emission characteristic.

2. The method of claim 1,
   wherein the first emission characteristic comprises a first polarization, and
   wherein the second emission characteristic comprises a second polarization.

3. The method of claim 1,
   wherein the first emission characteristic comprises a first pulse shape, and
   wherein the second emission characteristic comprises a second pulse shape.

4. The method of claim 1, wherein the first emission characteristic and the second emission characteristic comprise firing sequence characteristics.

5. The method of claim 4, wherein the firing sequence characteristics comprise charging times for capacitors.

6. The method of claim 4, wherein the firing sequence characteristics comprise discharging time for capacitors.

7. The method of claim 4, wherein the firing sequence characteristics comprise a predetermined amount of time between emissions.

8. The method of claim 7, wherein the predetermined amount of time is 200 ns, 500 ns, 700 ns, 1 µs, 1.5 µs, 2 µs, 3 µs, 5 µs, 8 µs, 10 µs, 15 µs, 20 µs, 50 µs, 100 µs, 1 ms, or 1 s.

9. The method of claim 1,
   wherein the first emission characteristic comprises a first emission power.

10. A light detection and ranging (lidar) device comprising:
    an array of light emitters;
    an array of light detectors, wherein each of the light detectors is associated with one or more light emitters in the array of light emitters; and
    a controller configured to:
       cause, during a first firing cycle of a firing sequence, a first plurality of light emitters within the array of light emitters to emit light signals having a first emission characteristic;
       cause, during the first firing cycle, each light detector within the array of light detectors that is associated with the first plurality of light emitters to listen for light signals reflected from a surrounding environment;
       cause one or more light emitters within the first plurality of light emitters to emit one or more light signals having a second emission characteristic during a second firing cycle of the firing sequence, wherein the second emission characteristic differs from the first emission characteristic;
    cause, during the second firing cycle, a second plurality of light emitters within the array of light emitters to emit light signals having the first emission characteristic, wherein the second plurality of light emitters comprises the light emitters within the first plurality of light emitters that are not emitting light signals having the second emission characteristic during the second firing cycle;
    cause, during the second firing cycle, each light detector within the array of light detectors that is associated with the first plurality of light emitters to listen for light signals from the surrounding environment; and
    identify whether interference is influencing measurements made by the lidar device, wherein identifying whether interference is influencing measurements made by the lidar device comprises determining, for each light detector of the lidar device that is associated with the first plurality of light emitters, whether any light signals detected during the second firing cycle correspond to the first emission characteristic or the second emission characteristic.

11. The lidar device of claim 10,
    wherein the first emission characteristic comprises a first polarization, and
    wherein the second emission characteristic comprises a second polarization.

12. The lidar device of claim 10,
    wherein the first emission characteristic comprises a first pulse shape, and
    wherein the second emission characteristic comprises a second pulse shape.

13. The lidar device of claim 10, wherein the first emission characteristic and the second emission characteristic comprise firing sequence characteristics.

14. The lidar device of claim 13, wherein the firing sequence characteristics comprise charging times for capacitors.

15. The lidar device of claim 13, wherein the firing sequence characteristics comprise discharging time for capacitors.

16. The lidar device of claim 13, wherein the firing sequence characteristics comprise a predetermined amount of time between emissions.

17. The lidar device of claim 16, wherein the predetermined amount of time is 200 ns, 500 ns, 700 ns, 1 µs, 1.5 µs, 2 µs, 3 µs, 5 µs, 8 µs, 10 µs, 15 µs, 20 µs, 50 µs, 100 µs, 1 ms, or 1 s.

18. The lidar device of claim 10,
wherein the first emission characteristic comprises a first emission power.

19. A non-transitory machine-readable medium having instructions stored thereon, wherein the instructions, when executed by a processor, perform a method comprising:
causing, during a first firing cycle of a firing sequence, a first plurality of light emitters within an array of light emitters to emit light signals having a first emission characteristic;
causing, during the first firing cycle, each light detector within the array of light detectors that is associated with the first plurality of light emitters to listen for light signals reflected from a surrounding environment;
causing one or more light emitters within the first plurality of light emitters to emit one or more light signals having a second emission characteristic during a second firing cycle of the firing sequence, wherein the second emission characteristic differs from the first emission characteristic;
causing, during the second firing cycle, a second plurality of light emitters within the array of light emitters to emit light signals having the first emission characteristic, wherein the second plurality of light emitters comprises the light emitters within the first plurality of light emitters that are not emitting light signals having the second emission characteristic during the second firing cycle;
causing, during the second firing cycle, each light detector within the array of light detectors that is associated with the first plurality of light emitters to listen for light signals from the surrounding environment; and
identifying whether interference is influencing measurements made by a lidar device, wherein identifying whether interference is influencing measurements made by the lidar device comprises determining, for each light detector of the lidar device that is associated with the first plurality of light emitters, whether any light signals detected during the second firing cycle correspond to the first emission characteristic or the second emission characteristic.

20. The non-transitory machine-readable medium of claim 19, wherein the first emission characteristic comprises a first emission power.

* * * * *